United States Patent
Cao

(10) Patent No.: US 11,855,501 B2
(45) Date of Patent: *Dec. 26, 2023

(54) NANOSTRUCTURED INSULATION FOR ELECTRIC MACHINES

(71) Applicant: University of Connecticut, Farmington, CT (US)

(72) Inventor: Yang Cao, Glastonbury, CT (US)

(73) Assignee: University of Connecticut, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,300

(22) Filed: Dec. 9, 2022

(65) Prior Publication Data
US 2023/0108742 A1    Apr. 6, 2023

Related U.S. Application Data

(63) Continuation of application No. 16/539,526, filed on Aug. 13, 2019, now Pat. No. 11,569,701.
(Continued)

(51) Int. Cl.
*H01B 3/46* (2006.01)
*H02K 3/30* (2006.01)
(Continued)

(52) U.S. Cl.
CPC ............... *H02K 3/30* (2013.01); *H02K 3/50* (2013.01); *H02K 15/105* (2013.01); *H02K 15/12* (2013.01);
(Continued)

(58) Field of Classification Search
CPC ... H01B 3/02; H01B 3/04; H01B 3/30; H01B 7/02; H01B 7/04; H01B 7/06; H01B 7/12;
(Continued)

(56) References Cited

U.S. PATENT DOCUMENTS

2005/0145349 A1* 7/2005 El-Shall ............... D21C 5/025
162/6
2007/0117911 A1* 5/2007 Irwin ............... H01L 21/3122
524/495
(Continued)

FOREIGN PATENT DOCUMENTS

EP    0972805 A2    1/2000

OTHER PUBLICATIONS

Cao et al., "The Future of Nanodielectrics in the Electrical Power Industry", IEEE Transactions on Dielectrics and Electrical Insulation, vol. 11, No. 5, Oct. 2004, pp. 797-807.
(Continued)

*Primary Examiner* — William H. Mayo, III
(74) *Attorney, Agent, or Firm* — Michael Best & Friedrich LLP

(57) ABSTRACT

An insulating composition having a polymer resin, a nanoclay, and one or more nanofillers. The insulating composition has a thermal conductivity of greater than about 0.8 W/mK, a dielectric constant of less than about 5, a dissipation factor of less than about 3%, and a breakdown strength of greater than about 1,000 V/mil. The insulating composition has an endurance life of at least 400 hours at 310 volts per mil.

20 Claims, 27 Drawing Sheets

Related U.S. Application Data

(60) Provisional application No. 62/718,128, filed on Aug. 13, 2018.

(51) Int. Cl.
   | | |
   |---|---|
   | *H02K 3/50* | (2006.01) |
   | *H02K 15/10* | (2006.01) |
   | *H02K 15/12* | (2006.01) |
   | *H01B 3/42* | (2006.01) |
   | *H01B 3/30* | (2006.01) |
   | *H01B 3/12* | (2006.01) |
   | *H01B 3/40* | (2006.01) |

(52) U.S. Cl.
   CPC .............. *H01B 3/12* (2013.01); *H01B 3/305* (2013.01); *H01B 3/306* (2013.01); *H01B 3/40* (2013.01); *H01B 3/426* (2013.01); *H01B 3/427* (2013.01); *H01B 3/46* (2013.01)

(58) Field of Classification Search
   CPC ......... C08L 79/06; H02K 3/34; C02D 163/00; C08K 3/04; C08K 3/22; B32B 5/16; B32B 25/20; B32B 27/18
   USPC .................. 174/110 R, 120 R, 121 R, 122 R; 428/323, 328, 329, 339, 429, 447; 524/430, 445, 495
   See application file for complete search history.

(56) References Cited

U.S. PATENT DOCUMENTS

| | | | |
|---|---|---|---|
| 2008/0004391 A1* | 1/2008 | Chan | C08F 2/44 524/445 |
| 2013/0099621 A1* | 4/2013 | Bjorklund | H01B 7/0291 174/120 SR |
| 2013/0245161 A1* | 9/2013 | Hsieh | C08L 63/00 523/466 |
| 2014/0353000 A1 | 12/2014 | Yin et al. | |
| 2015/0155070 A1* | 6/2015 | Cao | H02K 3/30 524/404 |

OTHER PUBLICATIONS

Gropper et al., "Nanotechnology in high voltage insulation systems for large electrical machinery", CIGRE, Paper A1-A103, 2012.

International Search Report and Written Opinion for Application No. PCT/US2019/046332 dated Jun. 15, 2020 (14 pages).

Liu et al., "Torque Enhancement and Re-rating of Medium-Voltage Induction Machines Using Nano-structured Stator Winding Insulation", IEEE Electric Ship Technologies Symposium, Aug. 2017, pp. 232-237.

Office of Naval Research, "Naval S&T Strategic Plan", 2011, 69 pages.

Stone et al, "Electrical Insulation for Rotating Machines: Design, Evaluation, Aging, Testing, and Repair", Chapter 4 "Stator Winding Insulation Systems in Current Use", Mohamed E El-Haward Editor, pp. 95-110, 2004.

Tari et al., "Impacts on Turbine Generator Design by the Application of Increased Thermal Conducting Stator Insulation", CIGRE, Paper No. 132, 6 pages, 2002.

Wikipedia, "Electric Motor," <https://en.wikipedia.org/wiki/Electric_motor> web page available at least as early as Jun. 15, 2020.

* cited by examiner

NANOSTRUCTURED INSULATION FOR ELECTRIC MACHINES

RELATED APPLICATIONS

This application is a continuation of U.S. patent application Ser. No. 16/539,526, filed Aug. 13, 2019, which claims the benefit of U.S. Provisional Patent Application No. 62/718,128, filed Aug. 13, 2018, the entire content of which is hereby incorporated by reference.

FEDERALLY SPONSORED RESEARCH

This invention was made with government support under grant number N00014-15-1-2413 awarded by the Office of Naval Research. The government has certain rights in the invention.

FIELD

Embodiments described herein relate to insulation, such as winding insulation for electric machines.

SUMMARY

The greatest concentration of heat inside an electric propulsion motor occurs in the copper strands of the winding. The primary path for heat removal starts from the copper conductor heat source, conducts through a series of successive thermal resistances in the ground-wall insulation (e.g., conductor shield, mica tape insulation, etc.), armature, corona shield, side springs, slot liners, iron, and finally to the stator cooling ducts. The largest temperature gradient corresponds to the temperature differential across the insulation, which indicates the dominant role that the thermal resistance of stator insulation plays in the temperature of stator copper in medium voltage motors.

Current state-of-the-art ground-wall insulation is predominantly micaceous with multiple layers of taped glass-fabric reinforced mica paper bonded together with an epoxy binder. Mica is a group of phyllosilicate minerals (muscovite) with a layered platelet crystalline structures that can be split or delaminated into thin sheets texture to offer superior electrical discharge/corona resistance. However, the flaky structures of muscovite mica correspond to a very low through-plane thermal conduction. Mica's limited elongation capability leads also to crack and voids formation under rapid thermal loads and constant double frequency magnetic force. The delamination and voids will not only further reduce heat conduction, but also support electrical partial discharge that leads to aging and failure of the motor. Additionally, resin pockets between plys/layers-of-tapes and non-impregnated voids within mica paper lead to overall limited electrical, thermal, and mechanical performance for micaceous insulation systems.

There is a need for better performing electrical insulation systems. For example, high temperatures beyond 300° C. can occur in converter-duty, high-voltage, and high-frequency systems. Higher switching frequencies are desirable to reduce overall system footprint, filter size, and integration complexity, as well as increase the efficiency of electric machine systems. However, high switching frequencies create fast voltage ramp rates, which are problematic for electrical insulation. Additionally, electric machines are increasingly being used in harsh environments such as high temperature, high pressure, and sour gas/acid gas environments. It is estimated that approximately 32% of electric machine (e.g., motor) failures are a result of, or closely related to, electrical insulation failures.

The problem of electric motors failing has been conventionally addressed by using an oversized motor, limiting operating time, and using a cooling system. However, these approaches can add weight to the motor, and for many applications, smaller and lighter motors are required or desired.

Embodiments described herein provide a nanostructured insulation that offsets the limitations of existing medium voltage and high voltage micaceous insulation. For example, platelet (2D) fillers, which include stacked silicate platelets, with each layer thickness being approximately 1 nm, can be applied to rotating machine insulation systems. When uniformly dispersed and chemically bound to thermosetting binders with preferred orientation, desirable characteristics of electrical discharge resistance and high thermal conduction can be obtained.

Embodiments described herein provide nanostructured insulation that can be applied to indirectly cooled advanced induction motors ("AIM") to offset the limitations of existing medium/high voltage insulation. The nanostructured insulation has high thermal conductivity of >0.8 W/mK, high breakdown strength of >1000 V/mil, low dielectric constant of less than 5, low dissipation factor of less than 3% at 155° C., and high electrical discharge and hence high voltage endurance life. The nanostructured insulations can replace micaceous insulation and achieve significantly increased performance (e.g., higher power/torque density) as a result of the incorporation of Zinc Oxide ("ZnO") and/or boron nitride ("BN"). When applied to electric machines (e.g., medium/high voltage motors), the nanostructured insulation provides at least a 15% higher torque density, improved ground-wall insulation having 2-times improved thermal conductivity, reduced insulation wall thickness for higher copper filling ratio and reduced copper loss, crack resistance insulation enabling a new integrated armature/corona-shield structure with lower thermal resistance, and new manufacturing processes that minimize bar shape variation associated thermal resistance.

This increased performance enables the construction of smaller, higher power density electric machines for transportation, energy generation, etc. Notably, the incorporation of ZnO into the insulator is counter-intuitive, and the improved performance is unexpected, because ZnO is a semiconductor and not an insulator. ZnO, however, helps dissipate arcing which, in turn, helps improve the performance of the insulation.

The nanostructured insulation can be used in large motors (representing approximately 60% of all electricity consumed) and generators (representing all electricity being generated). Other applications include AIMS, transformers, circuit breakers, permanent magnet motors electrically-propelled vehicles (e.g., destroyers, submarines, etc.), electromagnetic aircraft launch systems ("EMALS"), and other industrial applications that generally involve insulated conductors (e.g., busbars, power circuit boards, power distribution and transmission cables, isolation circuitry, enclosures or housings of power apparatuses and devices).

Embodiments described herein provide an insulating composition that includes a polymer resin, a nanoclay, and one or more nanofillers. The insulating composition has a dielectric constant of less than about 5, a dissipation factor of less than about 3%, and a breakdown strength of greater than about 1,000 V/mil. The insulating composition has an endurance life of at least 400 hours at 310 volts per mil.

Embodiments described herein provide a motor that includes a rotor, a stator, at least one winding associated with the rotor or the stator, and a nanostructured insulating composition applied to the at least one winding.

Embodiments described herein provide a method of insulating a motor. The motor includes a rotor, a stator, and at least one winding associated with the rotor or the stator. The method includes wrapping a winding around a current-carrying conductor of the motor and applying a nanostructured insulating composition to the winding.

Embodiments described herein provide an insulating composition comprising a polymer resin, a nanoclay, and one or more nanofillers. The insulating composition has a thermal conductivity of greater than about 0.8 W/mK, a dielectric constant of less than about 5, a dissipation factor of less than about 3%, and a breakdown strength of greater than about 1,000 V/mil.

Embodiments described herein provide a motor that includes a rotor, a stator, at least one winding associated with the rotor or the stator, and a nanostructured insulating composition applied to the at least one winding.

Embodiments described herein provide a method of insulating a motor. The motor includes a rotor, a stator, and at least one winding associated with the rotor or the stator. The method includes wrapping a winding around a lamination of the motor, and applying a nanostructured insulating composition to the winding.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein related to a nanostructured insulation that can be used with, for example, motor windings. The nanostructured insulation provides significant improvements over conventional insulation (e.g., mica-based systems) with respect to electrical, dielectric, thermal, and mechanical properties. The nanostructured insulation materials are based on high aspect ratio platelet nanofillers. For example, nano silicate (e.g., kaolinite aluminiumsilicate, montmorillonite smectite phyllosilicate, or talc-pyrophyllite magnesiumsilicate) and nitride platelets (e.g., having stacked layers with each layer thickness being on the order of 1 nm) were uniformly dispersed in epoxies with preferred orientation to achieve desirable characteristics of electrical resistance and high thermal conduction. In some embodiments, the composition of the nanostructured motor winding insulation comprises polymer resin (e.g., epoxy resin, silicone rubber, polyester resin, polyimides, polyamide-imides, polyetherimides, polysulfones, polyether ether keton, polycarbonates, polyamide-imides, or a related co-polymer), nanoclay (e.g., montmorillonite, kaolin, or talc), Zinc Oxide ("ZnO"), and/or boron nitride ("BN").

The nanostructured insulation is a 2D nanoclay-based nanostructured insulation. The nanostructured insulation achieves higher power/torque density and efficiency when compared to mica-based systems. The nanostructured insulation has a high thermal conductivity of >0.8 W/mK, high breakdown strength of >1000 V/mil, low dielectric constant of less than 5, low dissipation factor of less than 3% at 155° C., and high electrical discharge endurance life. Such a nanostructured insulation is particularly applicable to electric propulsion applications, advanced induction motors ("AIMs") (e.g., for submarines, cars, locomotives, etc.), and power generators. In these applications, heat dissipation from the motor's stator is critical to their overall performance. The nanostructured insulation allows motors to run cooler, to operate at higher efficiency, to operate with increased power density or torque, and/or to be made smaller.

Sample Preparation

Figure 1:
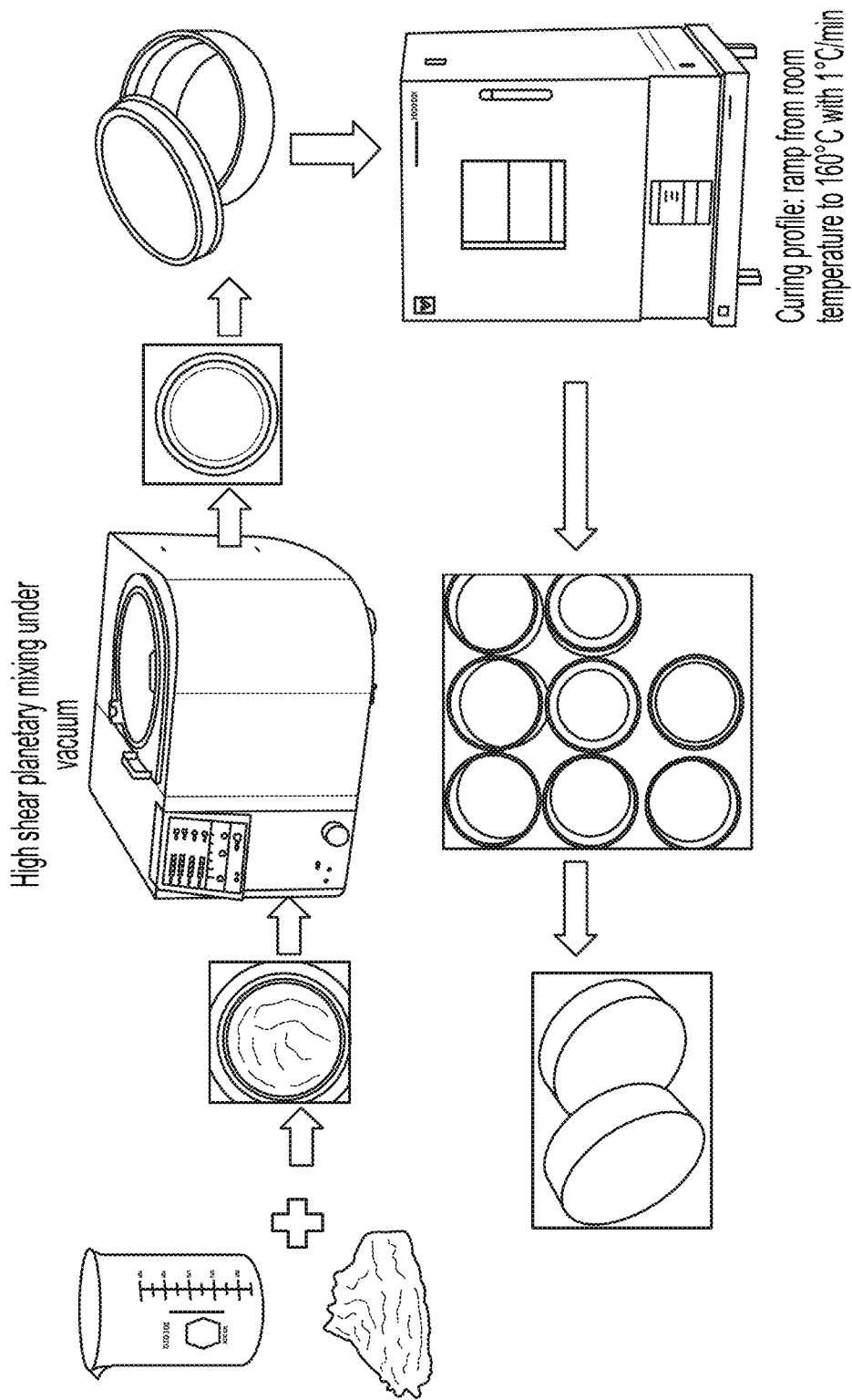
FIG. 1 illustrates a polymer/nanofiller composite preparation process.
Figure 2:
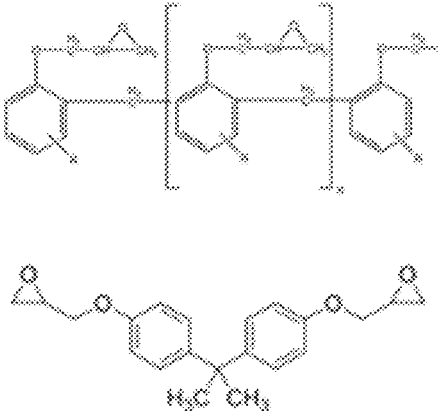
FIG. 2 illustrates nanoclay platelet structures for nanostructured insulation materials, according to embodiments described herein.

FIG. 1 shows the schematics of the sample preparation process of a polymer/nanofiller composite. High performance one part polymer resin was provided by Vonroll. The 2D fillers contain nanostructured platelets with each layer thickness being on the order of 1 nm. To eliminate moisture, all the fillers were pre-dried at 120° C. overnight. A planetary Thinky® mixer with vacuum was employed for dispersing of 2D nanofiller in polymer resin under high shear and degassing over an extended period. The obtained void-free, homogenously dispersed mixture was then cast in a mold and cured at high temperature for 12 hours. After curing, the samples were machined and polished down to different thickness. For instance, the sample thickness for a thermal conductivity test is 5 mm, while the samples are 0.5 mm and 1 mm in thickness for complex dielectric permittivity and AC dielectric strength measurements, respectively.

Design of Experiment

As polymer resin and nanofillers form a mixture, the proportions of the components are of special consideration because changes in one component will alter one or more other components, and hence the resulting nanocomposites properties. Such complications will increase with the number of the components and the potential existence of mutual effects among components. Therefore, it is useful to implement mixture Design of Experiments ("DoE") to systematically investigate the relationships between input factors (processes or component variables) and the output responses.

A. Mixture Variables and Mixture Constraints

There are four components in the mixture: polymer resin and functional nanofillers A, B and C. Before designing experimental mixtures, the filler loading constraints in the weight percentage were pre-determined as listed below in Table #1. Such constraints were made based on the processability as well as screening tests. The maximum total wt. % of all the fillers is determined to be 40%, the upper processing limit. Beyond 40 wt. %, non-optimal dispersion of nanofillers and non-uniform curing of polymer nanocomposites could take place. Some techniques were developed to overcome these processing challenges including the addition of reactive diluent such as vinyl toluene and pre-drying of the polymer resin. The final decision, however, was made to limit the upper loading limit at 40 wt. % to ensure good sample quality and reproducibility.

TABLE #1

Constraints of the Fillers as Inputs

| Component | Lower Limit (wt. %) | Upper Limit (wt. %) |
|---|---|---|
| A (Talc) | 20 | 30 |
| B (BN) | 5 | 20 |
| C (ZnO) | 0 | 15 |
| A + B + C | 25 | 40 |

Exemplary samples of exhibit mixtures are provided below in Table #2. In some embodiments, additional drying of the polymer resin using molecular sieves, optimized high shear mixing with ball milling under vacuum using a planetary mixer, optimized curing profile, or post curing heat treatment, were used to improve sample production. Such techniques were used to produce samples with a more uniform distribution of nanofillers and higher degree of cross-linking of polymer resin. In some embodiments, composition optimization (e.g. with higher loading of ZnO) unexpectedly contributed to significantly improved voltage endurance life (e.g., exceeding 3000 hours at 310 volts per mil ["VPM"] for 60 mil disk samples tested at 21,000 V AC [RMS]).

TABLE #2

Exhibit Compositions

| Sample | Talc (wt. %) | BN (wt. %) | ZnO (wt. %) | Total (wt. %) |
|---|---|---|---|---|
| Exhibit A | 22.5 | 13 | 4.5 | 40 |
| Exhibit B | 20 | 10 | 7.5 | 37.5 |
| Exhibit C | 20 | 10 | 10 | 40 |

B. Mixture Design

Figure 3:
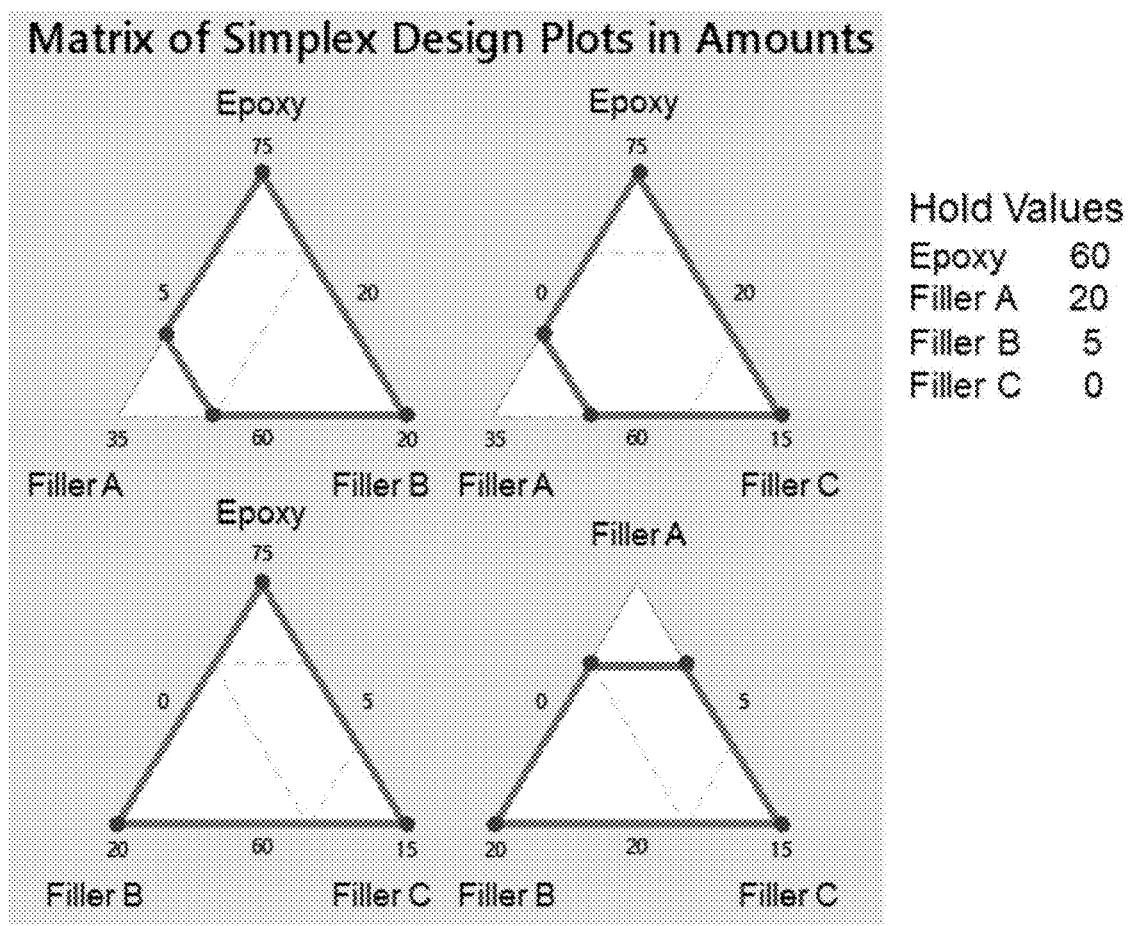
FIG. 3 illustrates mixture designs for a nanostructured insulation, according to embodiments described herein.

The mixture DoE was designed with extreme vertices. The geometry of the experimental region can be seen in FIG. 3. Each triangle represents the relative proportions of three components, with the proportion of the fourth ingredient is held at a certain value as marked at the right corner. The entire experimental region can be viewed as a (triangular) pyramid. Each blue point on the plot corresponds to a formulation with a certain concentration of polymer resin, filler A, filler B and filler C. With these specific parameters, a total of twenty-two runs of DoE were generated by Minitab 17 for different formulations of nanostructured composites. The run number of twenty-two is considered practical experimentally while sufficient statistically for high fidelity data generation and analysis.

C. Output Responses

The twenty-two formulation runs of the DoE were executed for the optimal nanostructured formulation. The design inputs include the percentile filler concentrations and processing conditions, while the outputs correspond to thermal conductivity (TA DTC-300), breakdown strength (BAUR DTA-100C), complex dielectric permittivity (Agilent 4284 LCR) and processability. The test results were fed into DoE analysis for optimal design response.

Figure 4:
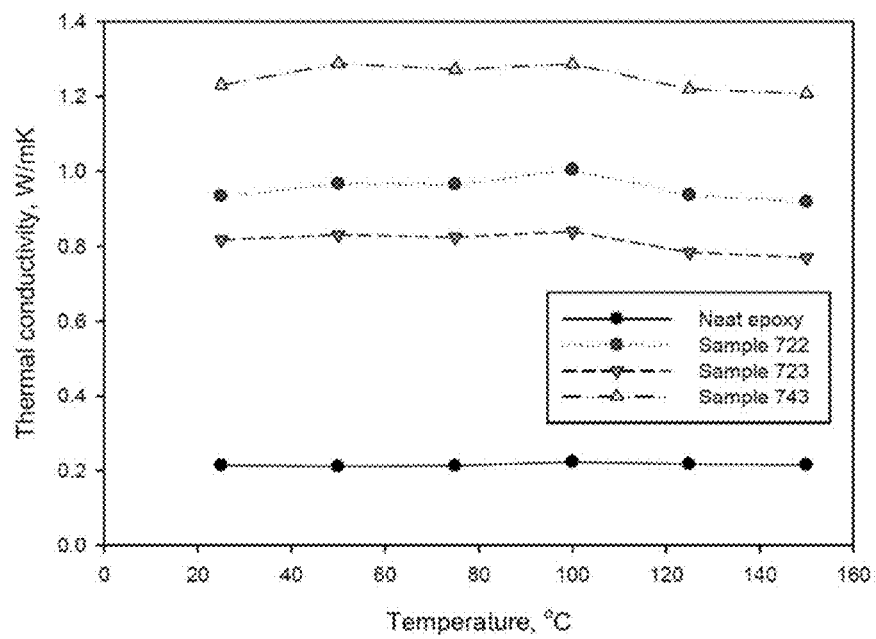
FIG. 4 is a graph of thermal conductivity of nanocomposite samples with greater than 2-times improvement in thermal conductivity over mica for a wide temperature range.
Figure 5:
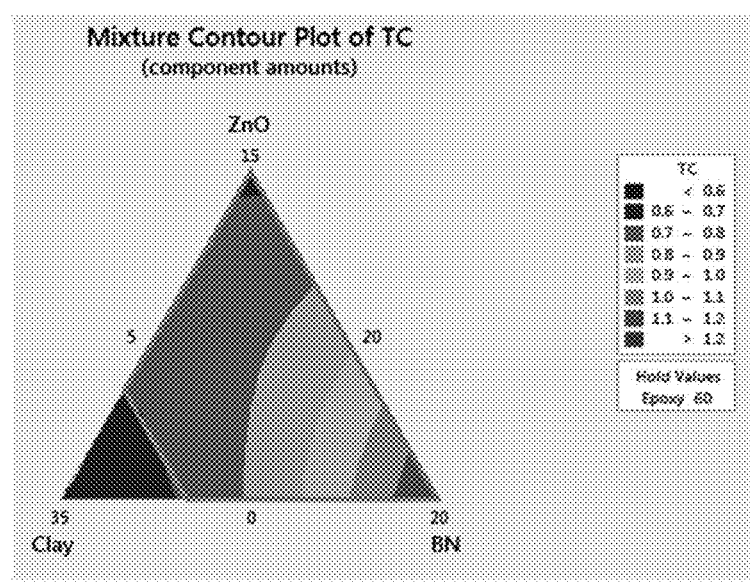
FIG. 5 is a mixture contour plot of thermal conductivity based on nanostructured insulation material component amounts.
Figure 6:
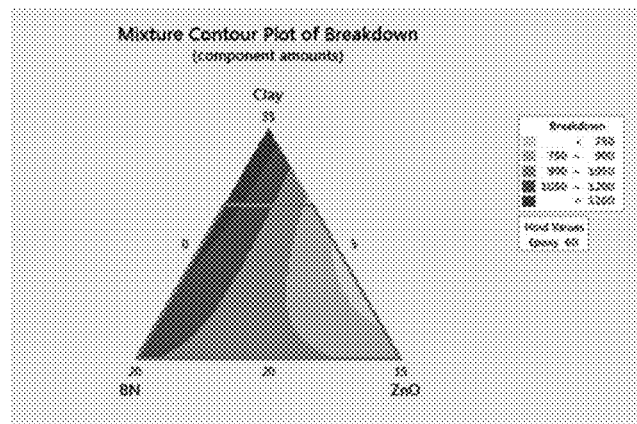
FIG. 6 is a mixture contour plot of voltage breakdown strength based on nanostructured insulation material component amounts.
Figure 7:
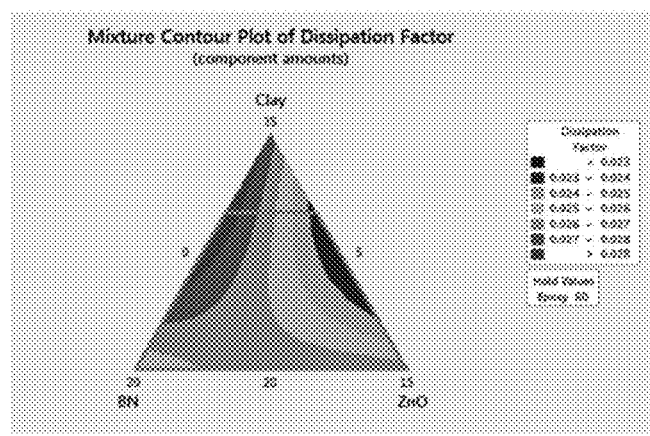
FIG. 7 is a mixture contour plot of dissipation factor based on nanostructured insulation material component amounts.
Figure 8:
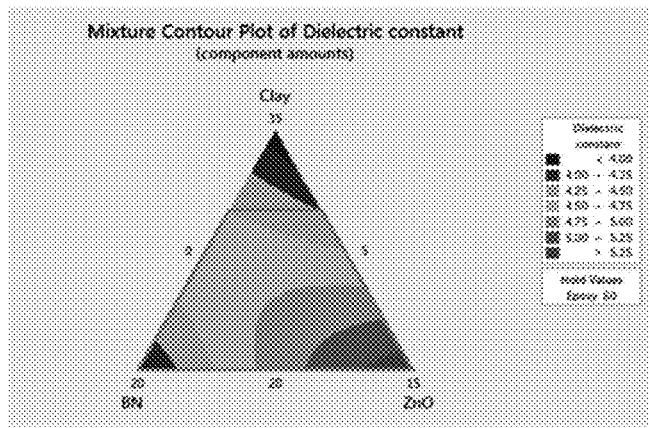
FIG. 8 is a mixture contour plot of dielectric constant based on nanostructured insulation material component amounts.

FIG. 4 highlights the stable thermal conductivity over a wide range of temperatures from 25° C. to 150° C. for representative formulations from DoE. A huge improvement in thermal conductivity can be achieved by adding nanostructured functional fillers into polymer resin. While the thermal conductivity of neat polymer resin is only 0.2 W/mK, it can be augmented to 1.2 W/mK with nanostructured fillers.

1. Dielectric Constant and Dissipation Factor

The dielectric constant of pure polymer resin is 4.15 and the loss factor is 2% at 100 Hz and 150° C. Adding nanofillers within constraints of the embodiments described herein leads to an increase to 5.5 and 3%, respectively.

2. Dielectric Breakdown Strength

The dielectric breakdown test was performed on disk samples immersed in silicone oil. The electrodes are flat, circularly shaped, one inch diameter copper blocks, with rounded corners of 1 mm radius. The test samples were machined to 1 mm in thickness. The voltage ramping rate was 2 kV/s. For each formulation, there were five samples tested and the average breakdown strength was recorded. Among the twenty-two formulations, the breakdown strength varies from 700-1400 V/mil. The experimental results were then fed into the DoE Analyzer to identify the relationship between fillers, their concentrations, and the output response.

D. Overlaid Contour Plot for the Mixture Design

The DoE constructed by using Minitab 17 facilitates multivariable responsive surface analysis. The contour plots for multiple responses are drawn and then overlaid on top of each other in a single graph to identify and visualize the optimal design region satisfying simultaneously all the design requirements, which include thermal conductivity, breakdown strength, dielectric constant, and dissipation factor with preferred values listed below in Table #3.

Figure 9A:
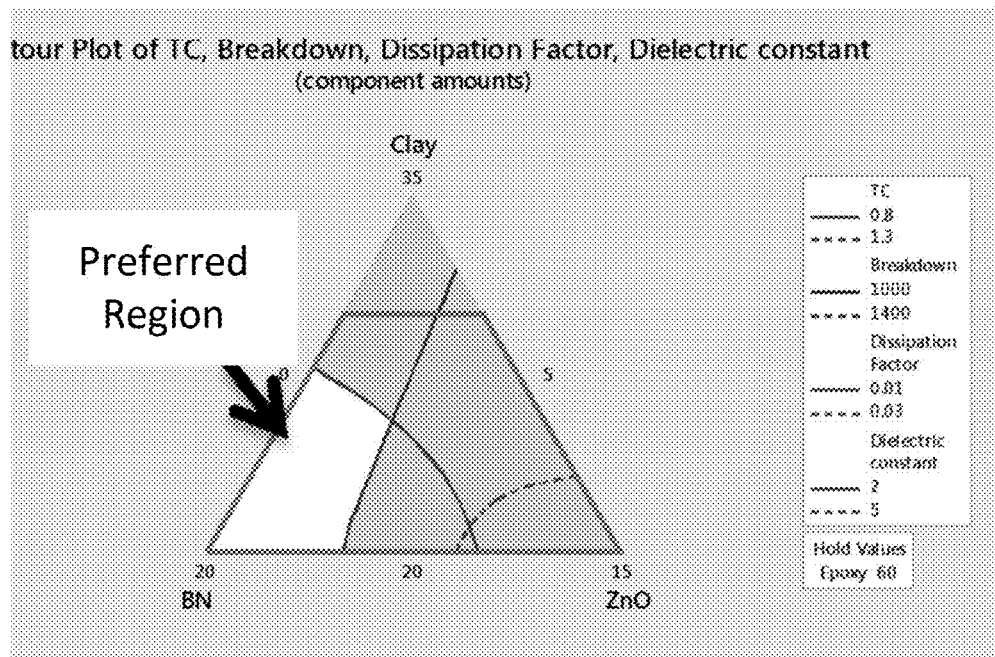
FIG. 9A illustrates overlaid contour plots for a nanostructured insulation mixture design, according to embodiments described herein.
Figure 9B:
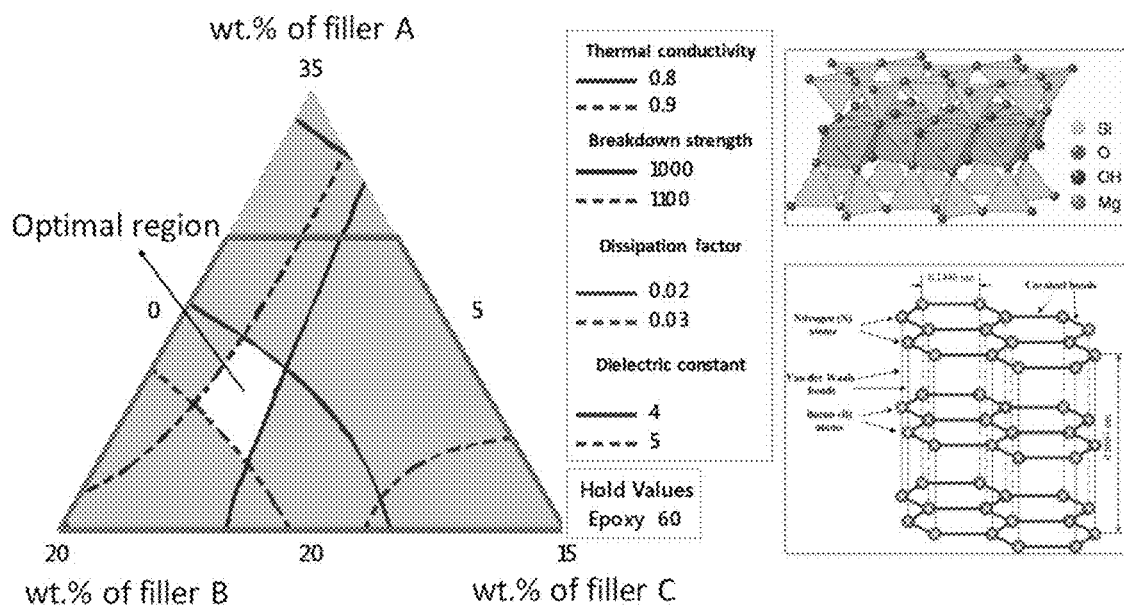
FIG. 9B illustrates overlaid contour plots for a nanostructured insulation mixture design, according to embodiments described herein.

The overlaid contour plots of thermal conductivity, breakdown, dissipation factor, and dielectric constant responses can be found in FIGS. 9A and 9B with the highlighted optimal region of design for polymer/nanofillers formulations. It can be seen that within the constraint region of the DoE, while the required values of dissipation factor and dielectric constant are satisfied for a wide range of fillers concentration, the thermal conductivity and breakdown strength are met only in a certain fillers proportion (See Table 3 below). Each of these properties is mainly determined by a specific filler (i.e., thermal conductivity by filler B and breakdown strength by filler C). As such, the percentage of filler B is recommended to be from 10-15 wt. %, while filler C should be kept in less than 7 wt. %.

TABLE #3

Desired Output Responses

| Characteristics: | Requirements: |
|---|---|
| Thermal conductivity | >0.8 W/mK |
| Dielectric constant | <5 |
| Dissipation factor | <3% |
| Breakdown strength | >1000 V/mil |

Figure 9C:
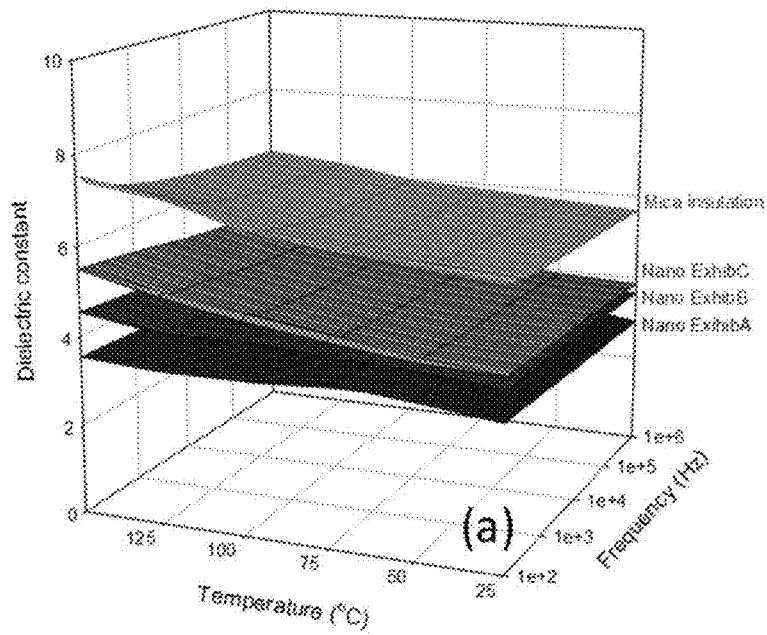
FIG. 9C illustrates the dielectric constant for nanostructured insulation compared to micaceous insulation.
Figure 9D:
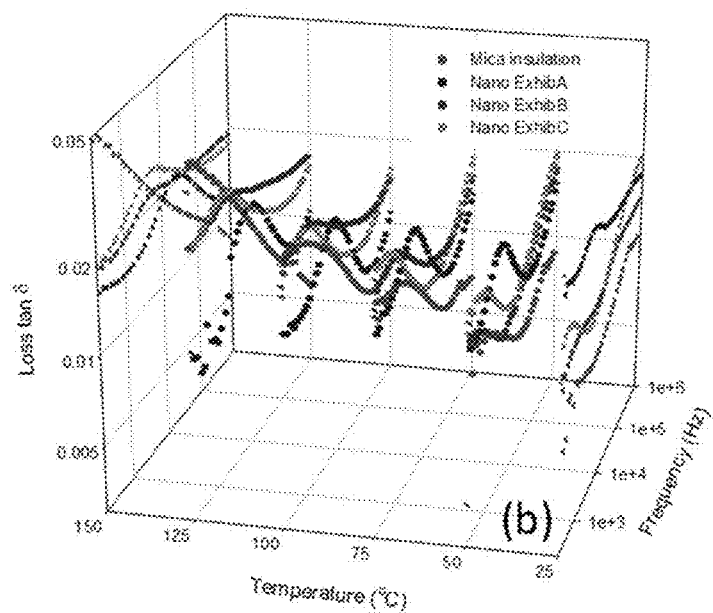
FIG. 9D illustrates the dielectric loss factor for nanostructured insulation compared to micaceous insulation.
Figure 9E:
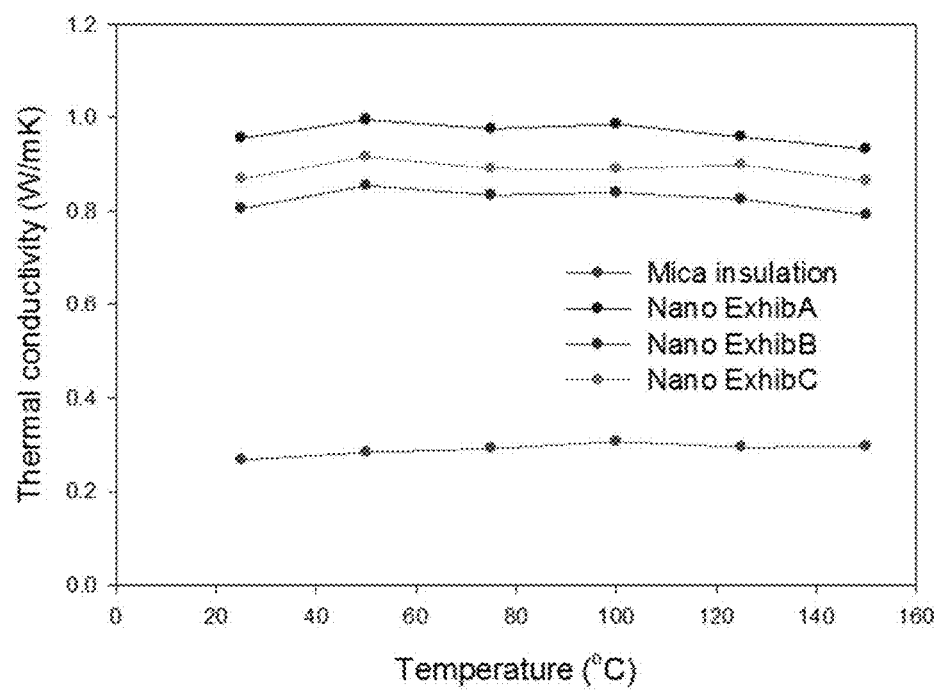
FIG. 9E illustrates thermal conductivity vs. temperature for nanostructured insulation compared to micaceous insulation.
Figure 9F:
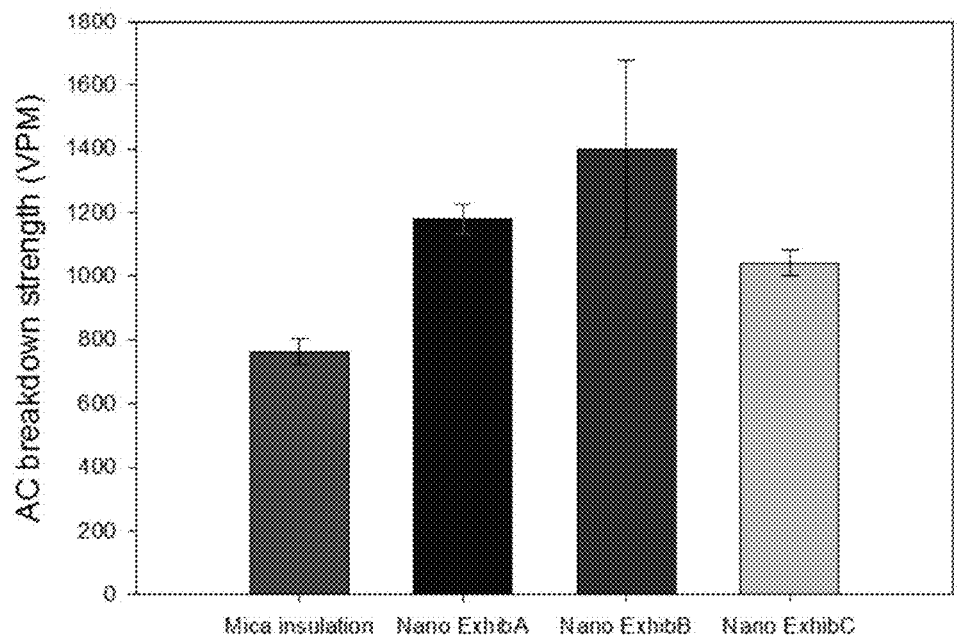
FIG. 9F illustrates room temperature breakdown strength for nanostructured insulation compared to micaceous insulation.
Figure 9G:
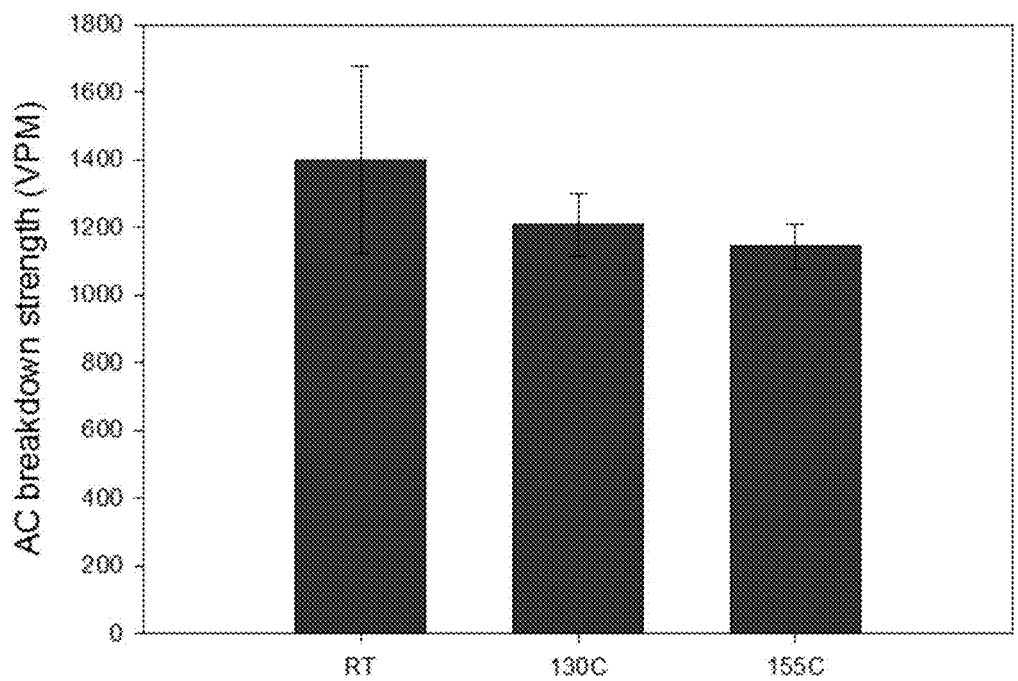
FIG. 9G illustrates elevated temperature breakdown strength for nanostructured insulation.

As shown in FIGS. 9C and 9D, all the formulations exhibited low dielectric constant and low loss factor over a broad range of frequencies and temperatures. For example, at 155° C., the loss factors for Exhibits A, B and C are each at or below approximately 2.5%, while the dielectric loss factor for micaceous insulation is approximately 5%. Additionally, Exhibits A, B, and C have higher thermal conductivities of >0.8 W/mK compared to micaceous insulation with a thermal conductivity of only approximately 0.25 W/mK (see FIG. 9E). Also, as demonstrated in FIGS. 9F and 9G, the breakdown strengths of Exhibits A, B, and C are also improved by approximately 30% and are maintained at elevated temperatures of up to 155° C. A summary of output responses is provided below in Table 4.

TABLE #4

Actual Output Responses

|  | Micaceous | Target | Exhibit A | Exhibit B | Exhibit C |
|---|---|---|---|---|---|
| Thermal Class | F, H | F, H | F, H | F, H | F, H |
| Operating Strength | ~65 VPM (2.6 kV/mm) | >100 VPM (4 kV/mm) | 100 VPM (4 kV/mm) | 100 VPM (4 kV/mm) | 100 VPM (4 kV/mm) |
| Thermal Conductivity | 0.25 W/(mK) | >0.7 W/(mK) | 1.0 W/(mK) | 0.8 W/(mK) | 0.9 W/(mK) |
| Dielectric Strength | 750 VPM (30 kV/mm) | >1000 VPM (40 kV/mm) | 1175 VPM (47 kV/mm) | 1400 VPM (55 kV/mm) | 1075 VPM (43 kV/mm) |
| Loss Factor | >3% | <2.5% | <2.5% | <2.5% | <2.5% |
| Strain | <0.3% | >1% | >1% | >1% | >1% |
| Manufacturing | Taping/VPI | | Additive | | |

The variable analysis results reveal not only the effects of each filler on the characteristics of interest for the new nanocomposite insulation but also the estimated output response with the filler proportions acting as input variables.

Electrical Discharge Endurance Test

With the establishment of the performance contour plot where the output response variables can be estimated based on the proportions of the fillers, a first batch of five samples were selected for voltage endurance life validation. It is well known that the voltage endurance life is the most critical factor in rotating machine design and operation since partial discharge occurring in the weakest points of the insulation systems under high field may significantly shorten the service life of the electrical machines. Four nanocomposite formulations named 744, 745 (Exhibit A), 746 (Exhibit B), and 747 (Exhibit C) were selected based on the DoE and tested for their voltage endurance life, along with the pure epoxy 74050 sample, which serves as a baseline reference. For each sample composition, at least five replicas were fabricated for testing.

A. Set Up for Electrical Discharge Endurance Test

Figure 10:
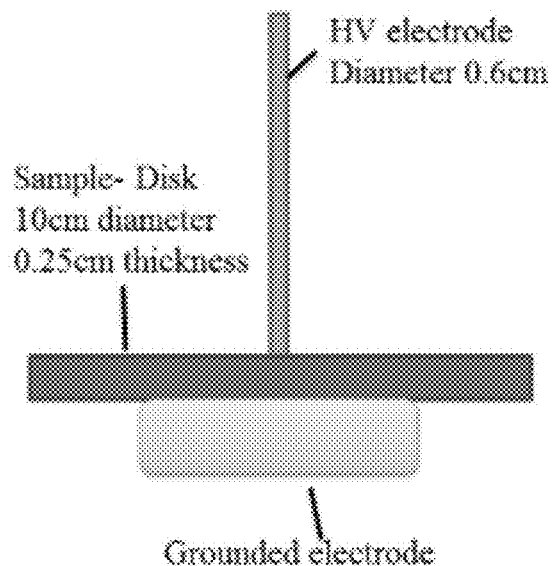
FIG. 10 illustrates an electrode arrangement for an electrical discharge endurance test according to IEC-60343 or ASTM D2275-89.
Figure 11:
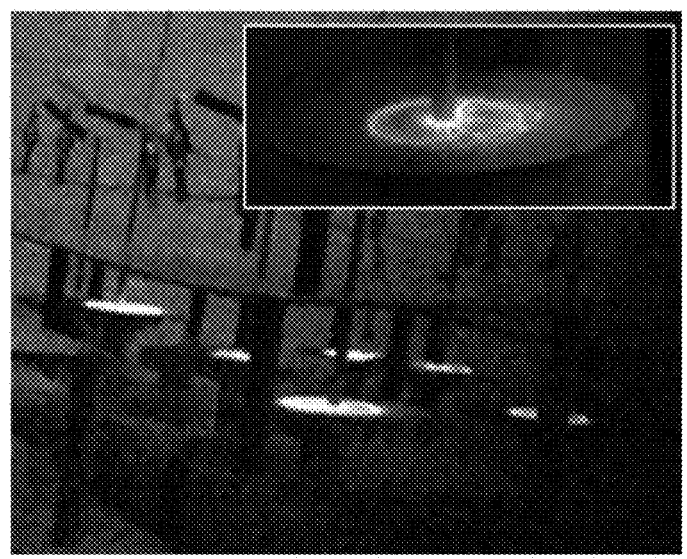
FIG. 11 illustrates electrical discharges on a sample surface under high voltage stress.

The electrical discharge endurance test was performed in accordance with the IEC-60343 standard or ASTM D2275-89 Standard. Disk coupons with diameter of 10 cm and thickness of 1.5 mm were prepared. The sample configuration and the entire experimental setup are shown in FIGS. 10 and 11. The test field was AC 312 VPM (12.5 kV/mm). With the application of high voltage, electrical discharge is generated around the high voltage electrode. The electrical discharge tends to spread out on the surface of the samples and attempts to develop into streamers that will flashover along the sample surface to the ground electrode. As shown in FIG. 11, there are intensive discharges developed on the sample surface. Under the bombardment and erosion of electrical discharges (plasma), the surface of the samples will gradually be eroded away due to the loss of materials.

B. Evaluation of Electrical Discharge Degradation 1. 3D Profilometry

Figure 12:
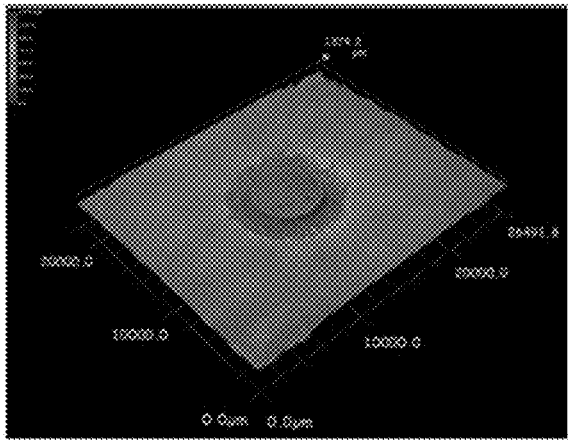
FIG. 12 illustrates a 3D-Profilometry of a pure epoxy sample after 270 hours of aging.
Figure 13:
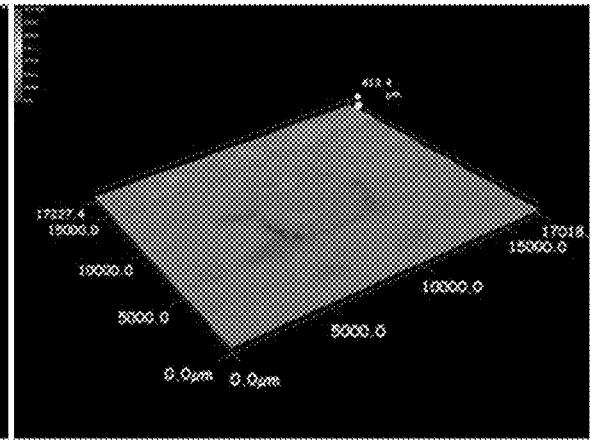
FIG. 13 illustrates a 3D-Profilometry of sample 744 after 270 hours of aging.
Figure 14:
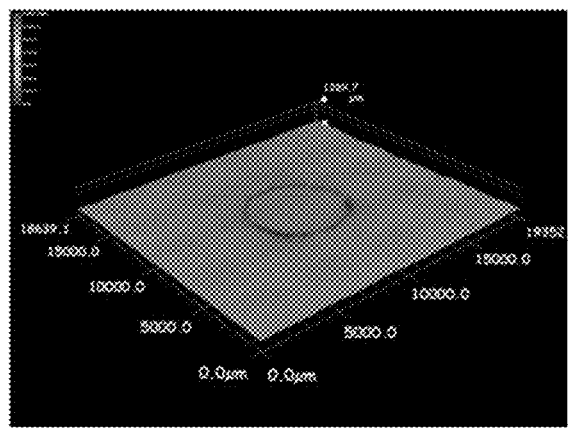
FIG. 14 illustrates a 3D-Profilometry of sample 745 after 270 hours of aging.
Figure 15:
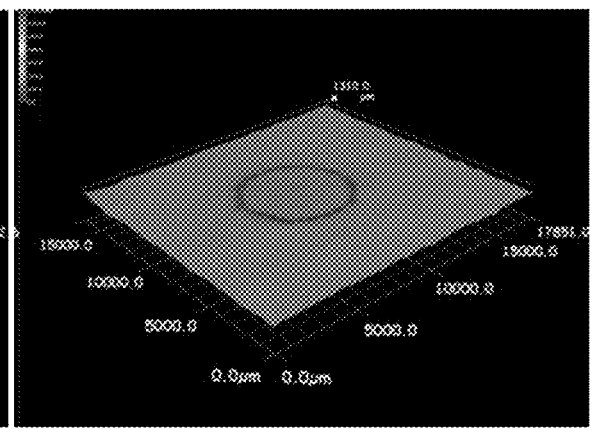
FIG. 15 illustrates a 3D-Profilometry of sample 746 after 270 hours of aging.
Figure 16:
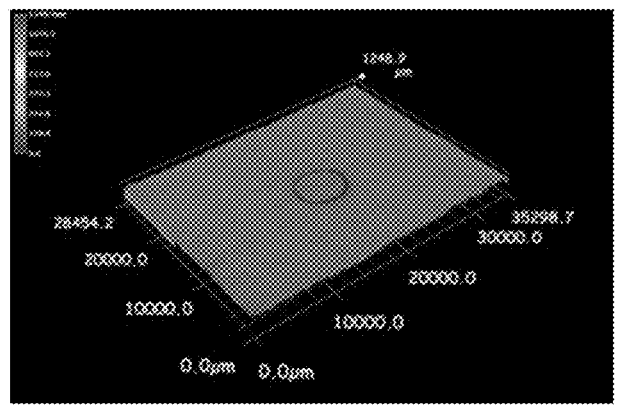
FIG. 16 illustrates a 3D-Profilometry of sample 747 after 270 hours of aging.
Figure 17:
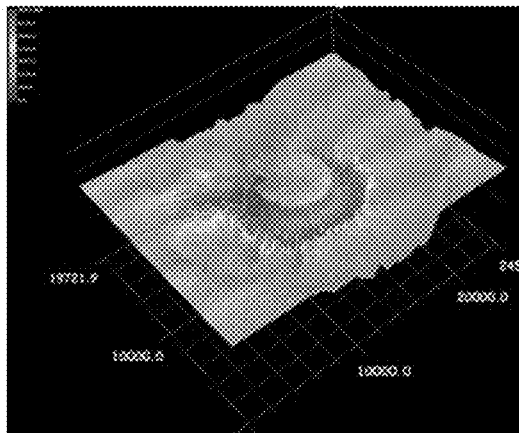
FIG. 17 illustrates a 3D-Profilometry of the pure epoxy sample of FIG. 12 after 568 hours.
Figure 18:
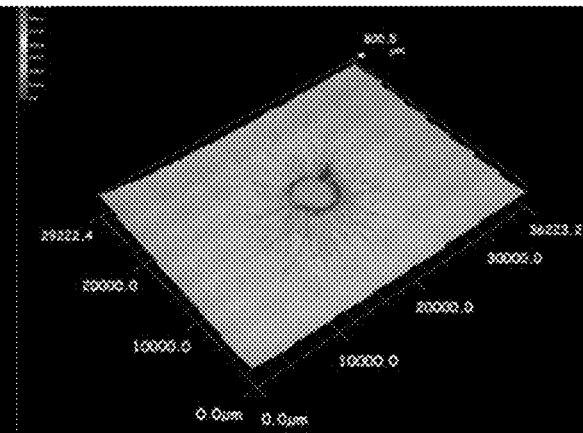
FIG. 18 illustrates a 3D-Profilometry of sample 744 after 1386 hours.
Figure 19:
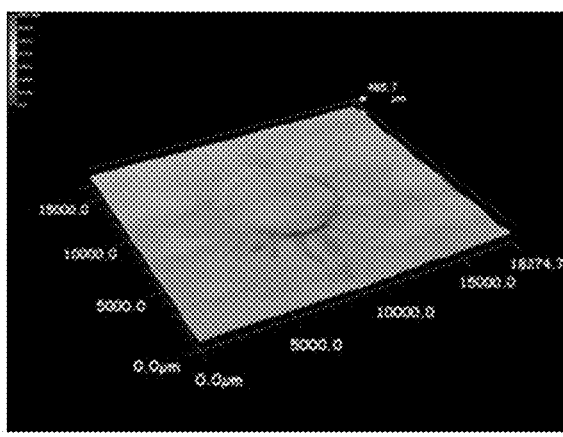
FIG. 19 illustrates a 3D-Profilometry of sample 745 after 1086 hours.
Figure 20:
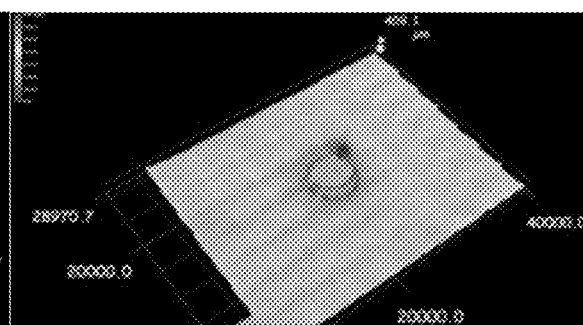
FIG. 20 illustrates a 3D-Profilometry of sample 746 after 1711 hours.
Figure 21:
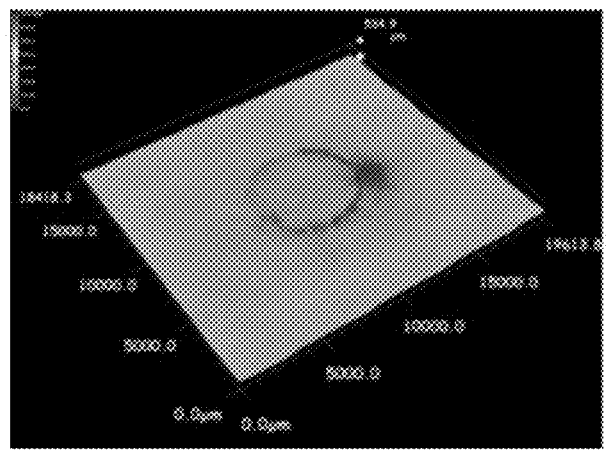
FIG. 21 illustrates a 3D-Profilometry of sample 747 after 1720 hours.

To quantitatively study the geometrical degradation of the surface erosion under discharge, 3D profilometry was applied (Keyence VHX-2000 Digital Microscope). FIGS. 12-16 show the 3D-profilometry of the surface erosion for samples subjected to 270 hours of testing, with the circle in the center of each photo represents the position of the high voltage electrode. There is a significant difference between the pure epoxy resin sample and the nanocomposite samples regarding their degrees of degradation. As can be seen in FIG. 12, the pure 74050 exhibited fully developed erosion channels, distributed radially from the edge of the high voltage electrode. In contrast, nanocomposite samples show varying degrees of much reduced erosion. On sample 744, there are certain amounts of erosion channels and surface of sample 744 became roughened (uneven) because of the loss of material, whereas the surface of sample 747 is still smooth with nearly no visible erosion channels. Samples 745 and 746 share the same erosion characteristics, which are somewhat in between samples 744 and 747.

FIGS. 17-21 show the 3D-profilometry of the failed sample surfaces due to eventual breakdown as the insulation wall eroded away. The sites of breakdown are the small darkened spots close to the edge of high voltage electrodes. On the surface of the pure epoxy resin sample, there are once again deep and wide erosion channels. As for sample 744, there were clearly very long, deep, and rough erosion channels, while the surfaces of samples 746 and sample 747 remained unchanged.

C. Depth of Erosion

Figure 22:
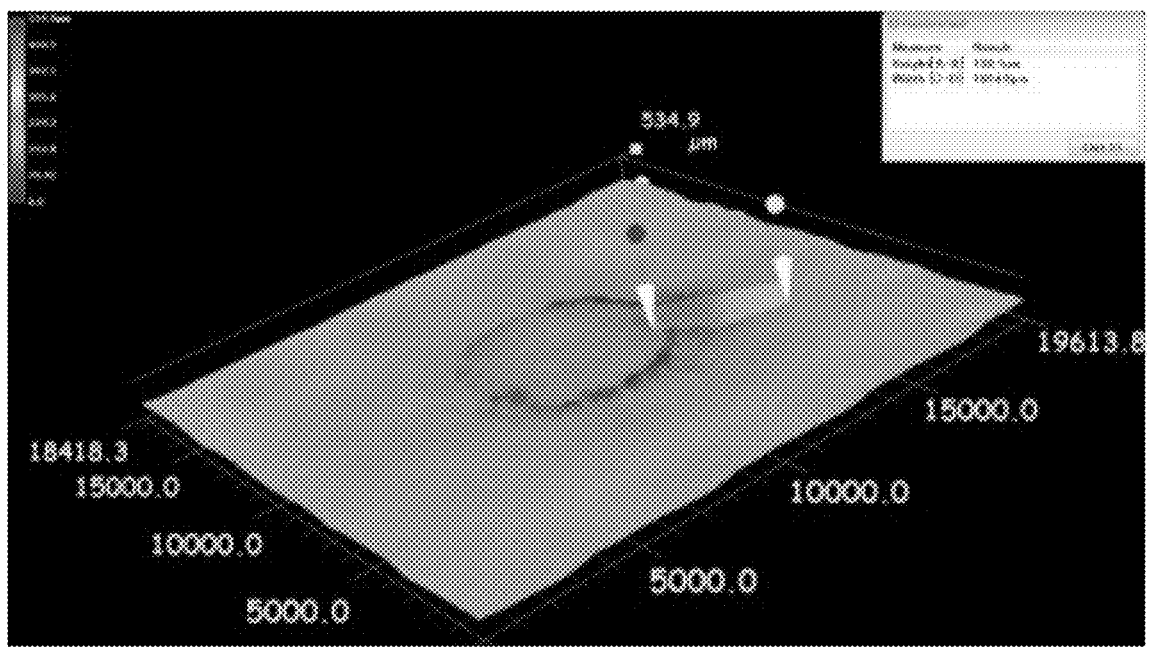
FIG. 22 illustrates a measurement of the deepest erosion channel between two points.
Figure 23:
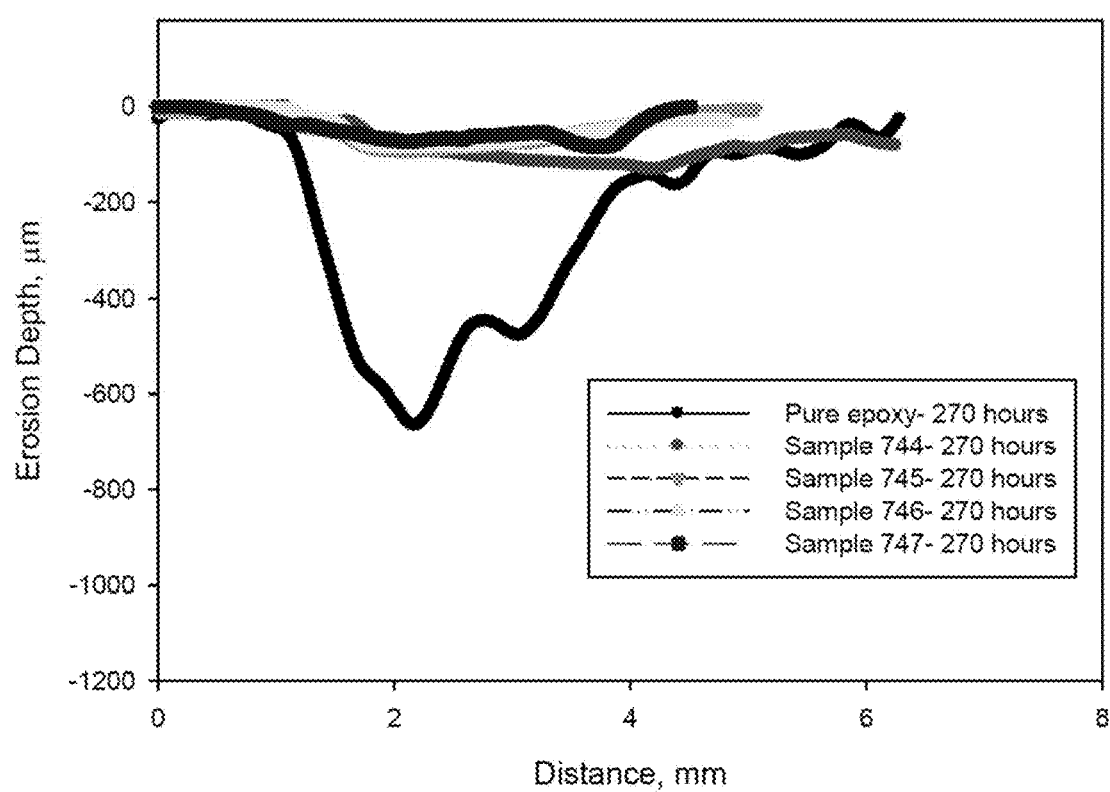
FIG. 23 is a graph of erosion depth of the samples after 270 hours of aging.
Figure 24:
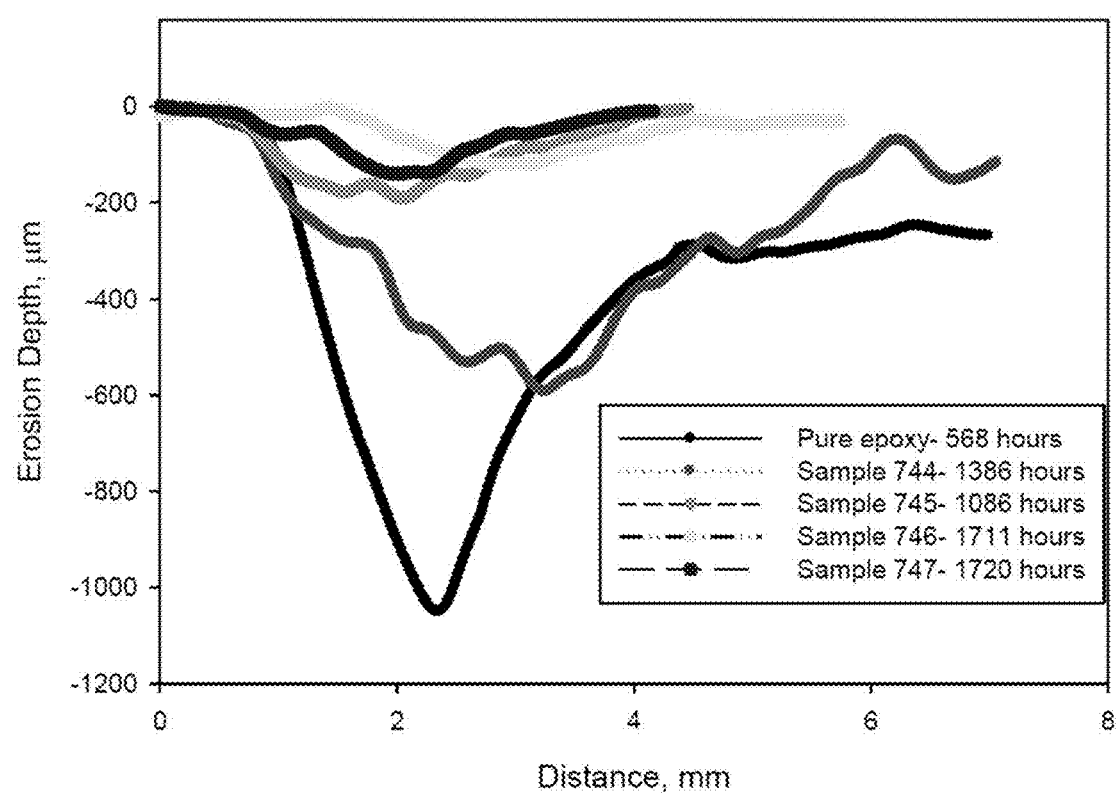
FIG. 24 is a graph of erosion depth of the samples.

Quantitative evaluation of the depth of erosion was carried out (see FIGS. 22-24). For each sample, the topology profile of the deepest erosion channel was measured between the two pin points as shown in the example, assuming that the area under the high voltage electrode was not eroded (FIG. 22). A comparison of the erosion depth for all the samples can be found in FIGS. 23 and 24. After 270 hours of aging, the depth of the erosion channel on pure epoxy resin surface can reach 600 µm. For nanocomposites, on the other hand, such erosion was at a moderate level of 50-100 µm. As shown in FIGS. 23 and 24, nanocomposite samples exhibit typically 5-times improved discharge resistance over the baseline epoxy, even with 3-times exposure time.

D. Volume of Erosion

Figure 25:
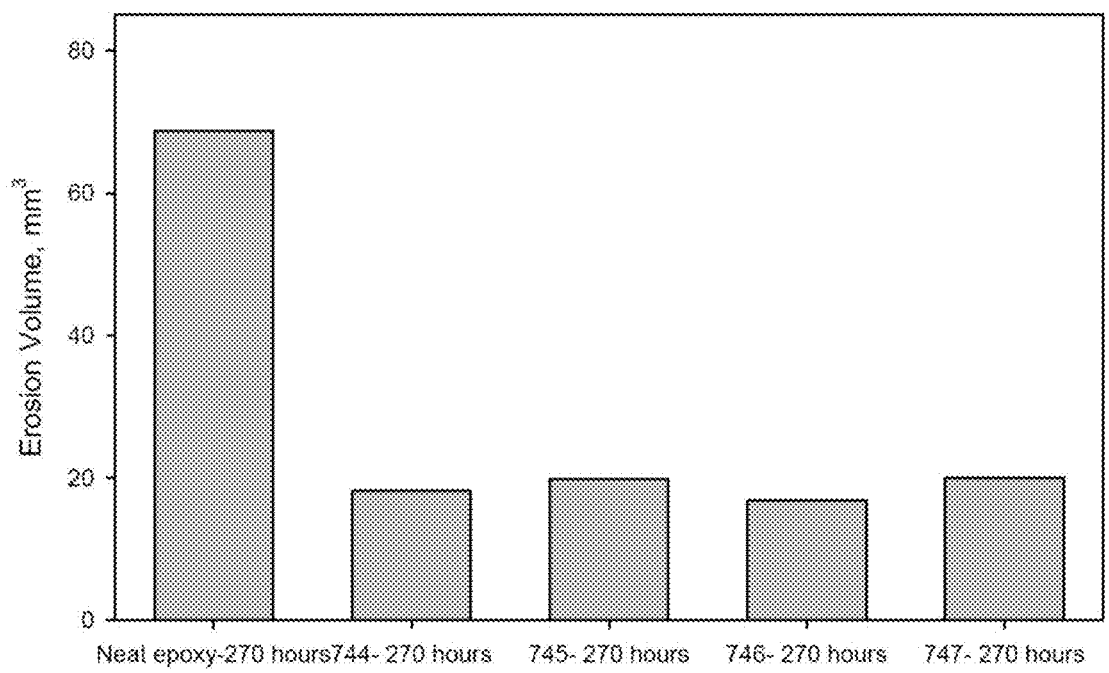
FIG. 25 is a graph of erosion volume of the samples after 270 hours of aging.
Figure 26:
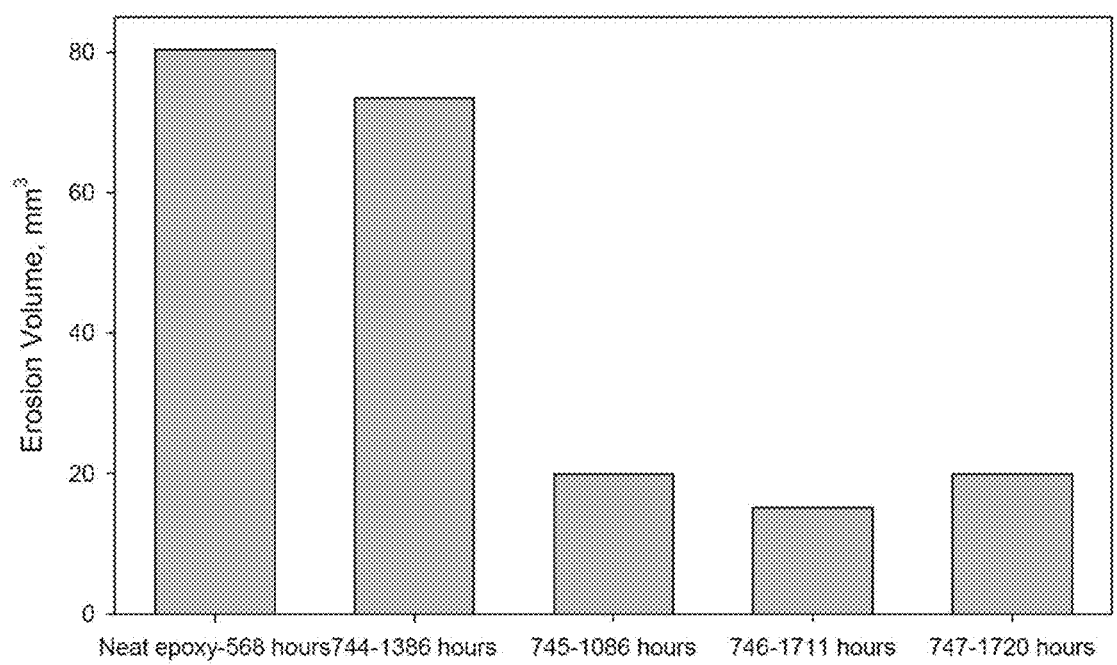
FIG. 26 is a graph of erosion volume of the samples.

The imaging processing software of Keyence VHX-2000 can measure the volume of any specified 3D area. Erosion volume corresponds to not only the depth of the erosion channels but also their length. Hence, the erosion volume can be considered a good metric for determining the material degradation under electrical discharge aging. The erosion volume was measured over a 2 cm×2 cm field of view centered on the high voltage electrode. As shown in FIGS. 25 and 26, while the corrosion degradation on neat epoxy and sample 744 develops very fast as time goes by, the deterioration of samples 745, 476 and 747 grows slowly after the first 270 hours.

E. Voltage Endurance Life

Figure 27A:
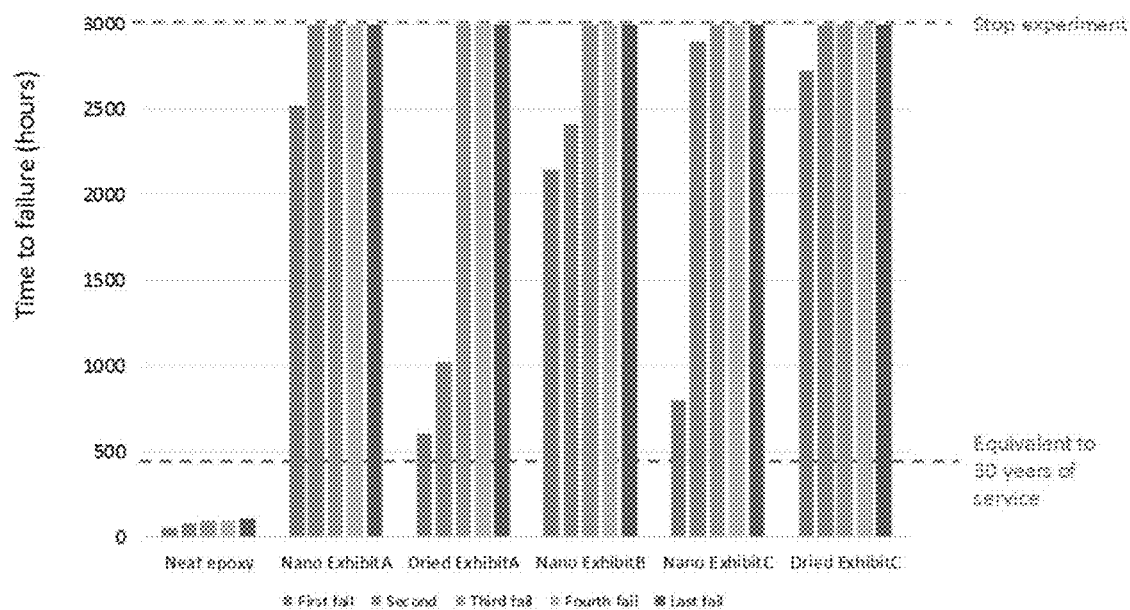
FIG. 27A is a graph of voltage endurance lifetime of nanostructured materials under 310 volts per mil ("VPM").
Figure 27B:
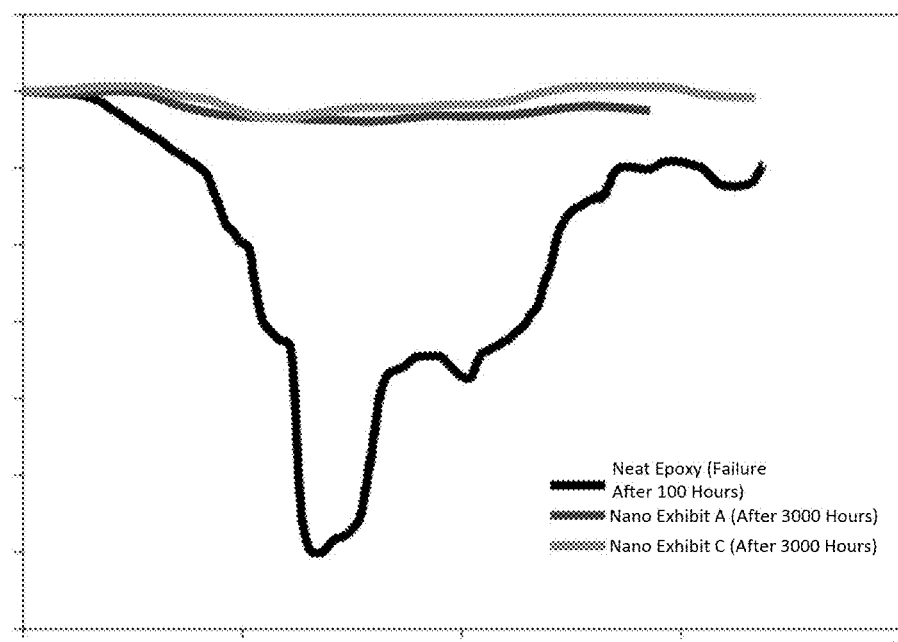
FIG. 27B illustrates erosion channels for nanostructured materials compared to an epoxy.

One of the key characteristics of an electrical discharge endurance test is the time to failure. As shown in FIG. 27A, the nanostructured materials demonstrated superior discharge endurance. The life time of the sample formulations increases significantly from approximately 100 hours for the neat epoxy resin to at least 3000 hours for Exhibits A, B, and C, at which point the endurance test was ended without some of the sample formulations failing. The deepest erosion channels on the sample surface was extracted to serve as a degradation characteristic for comparative evaluation (See FIG. 27B). For the neat epoxy resin, the epoxy surrounding the high voltage electrode was eroded completely away by high voltage electric discharge with the depth of the erosion channel reaching >1 mm after only 100 hours. The surface of nanostructured samples exhibited no degradation (e.g., approximately only 70 μm erosion) after 3000 hours of high voltage discharge erosion.

The extended service life of the samples corresponds, for example, to an excellent service life rating according to IEEE 1043/1553 standards (i.e., under testing conditions of 310 VPM). Specifically, all of the nanostructured sample formulations survived for 400 hours, which corresponds to 30 years of service life for the micaceous insulation system in accordance with the IEEE 1043/1553 standards. The endurance test was halted at 3000 hours, which is comparable to the lifetime of the highest-end state-of-the-art micaceous insulation system that is available. For each sample formulation, a minimum of 3 samples of nanostructured materials survived without failure to the 3000 hour threshold. The improved endurance of the nanostructured materials demonstrates high service reliability when used in electric machines (e.g., propulsion motors).

Self-Repairing Nano Structured Insulation

In addition to the superior electrical discharge resistance that produces extremely long endurance lifetime with limited mechanical erosion/degradation, nanostructured insulation also generates a self-repairing, nonlinearly conductive coating on the surface of the nanostructured insulation that results from reactive discharge.

Figure 28:
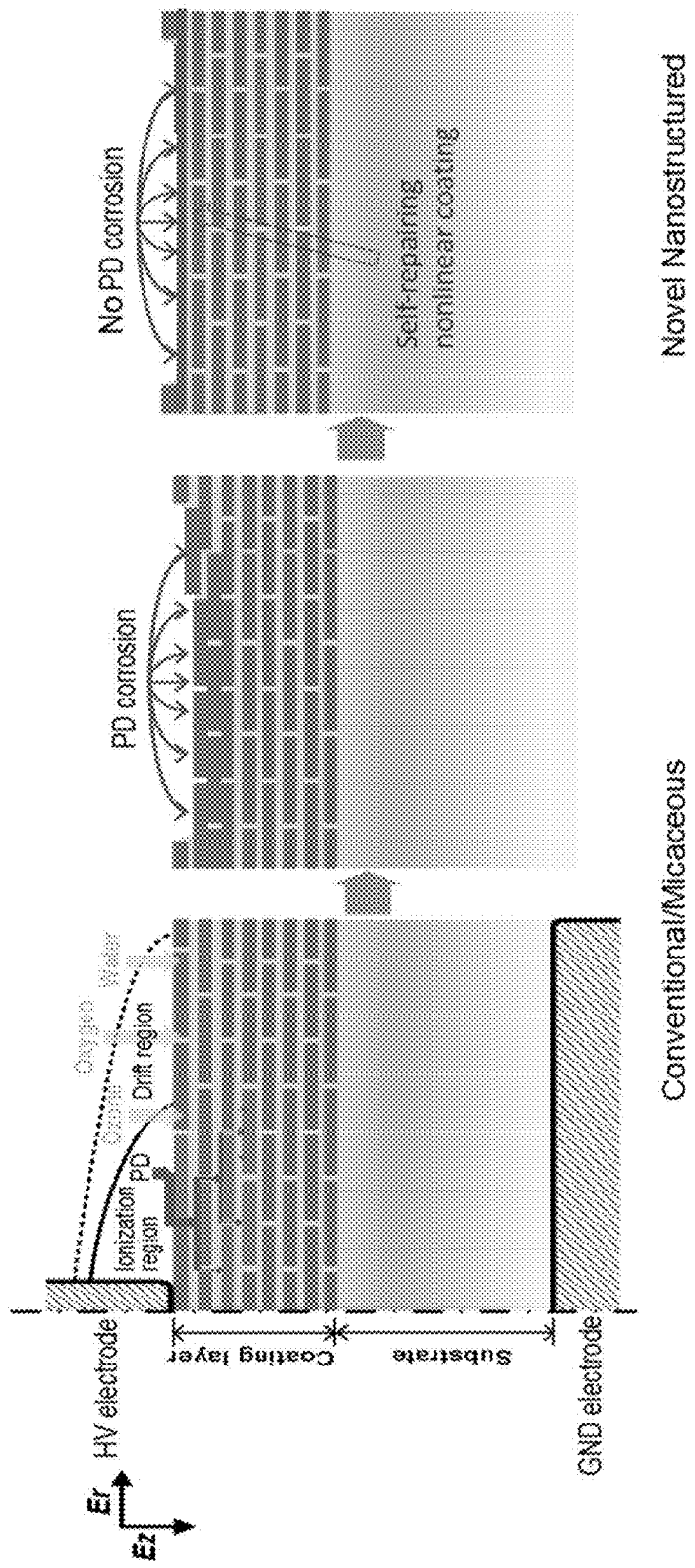
FIG. 28 illustrates a self-repairing, nonlinearly conductive coating on a surface of a nanostructured insulation.

As illustrated in FIG. 28, conventional materials (e.g., micaceous material) degrades gradually from ionization and bombardment by high voltage discharge. However, nanostructured insulation adaptively forms an electrical discharge protective and dissipative layer after exposure to electrical discharge. As a result, the nanostructured insulation self-repairs under discharge bombardment when exposed to electrical discharge (i.e., in locations with highly concentrated electrical stress or during defect formation). This generated layer physically covers and protects the underlying material from direct discharge pulses by forming a new layer of inorganic coating after organic polymer resin volatized away. The generated layer redistributes (e.g., spreads) the electrical stress and decreases the partial discharge activities near the edge of high voltage electrode where the electrical field is the highest. The nonlinearity of the generated layer is attributable to a nonlinear oxide layer generated by the reaction between the nanofillers (e.g., mixed in a particular ratio) in an electrical discharge environment. As a result, aggressive degradation at areas of locally enhanced electrical field is suppressed.

A. Energy Dispersive X-Ray Spectroscopy ("EDX")

Figure 29A:
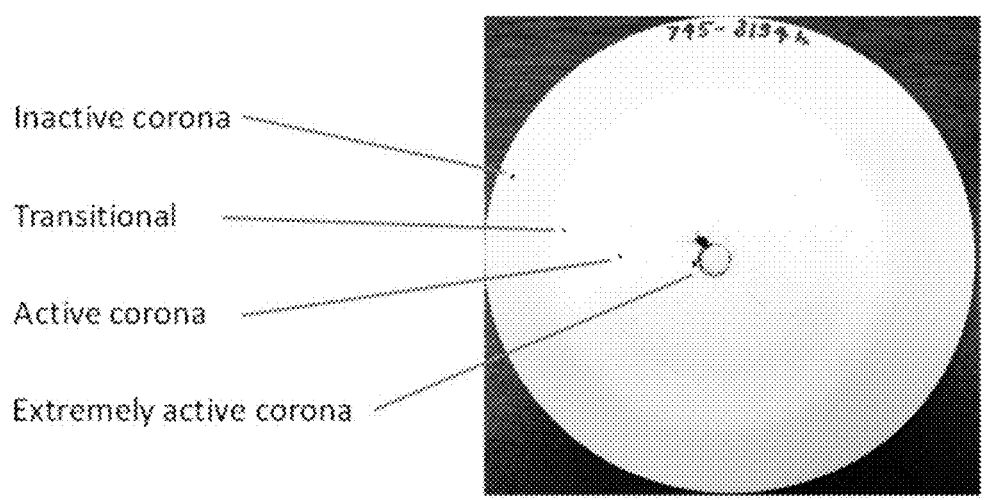
FIGS. 29A and 29B illustrate a sample after aging over regions having different discharge intensities.
Figure 29B:

Scanning electron microscopy with energy dispersive X-ray spectroscopy ("EDX") was used to examine the surface of nanostructured insulation after exposure to the high voltage discharge/voltage endurance test. As shown in FIGS. 29A and 29B, EDX examinations were performed at different locations with distinctive discharges. The discharge intensity is the strongest in the vicinity of the high voltage electrode and is the weakest in the inactive region away from the high voltage electrode.

The results of the nanostructured insulation EDX analysis are shown below in Table 5. The nanostructured insulation experiences a significant decrease in weight percentage of carbon (a constituent of organic polymer resin) from 32.37 wt. % in the inactive zone to around 2 wt. % in the active zone. By comparison with the inactive zone, the active zone experienced an enhancement of the concentrations of zinc, magnesium, and silicon. The electrical characteristics of the nanostructured insulation indicate that the generated self-repairing, nonlinearly conductive coating is an electrically conductive coating.

TABLE #5

EDX Analysis of Aged Nanocomposite Surface

| | Element (wt. %) | | | | | |
|---|---|---|---|---|---|---|
| | Carbon | Oxygen | Silicon | Magnesium | Zinc | Others |
| Inactive | 32.37 | 34.75 | 7.37 | 4.76 | 7.84 | 12.91 |
| Transitional | 4.59 | 46.82 | 16.03 | 6.44 | 12.34 | 13.78 |
| Active | 2.79 | 46.96 | 20 | 10.30 | 13.17 | 6.78 |
| Extreme | 4.57 | 41.59 | 15.76 | 7.98 | 20.42 | 9.68 |

B. Surface Resistivity

Figure 30A:
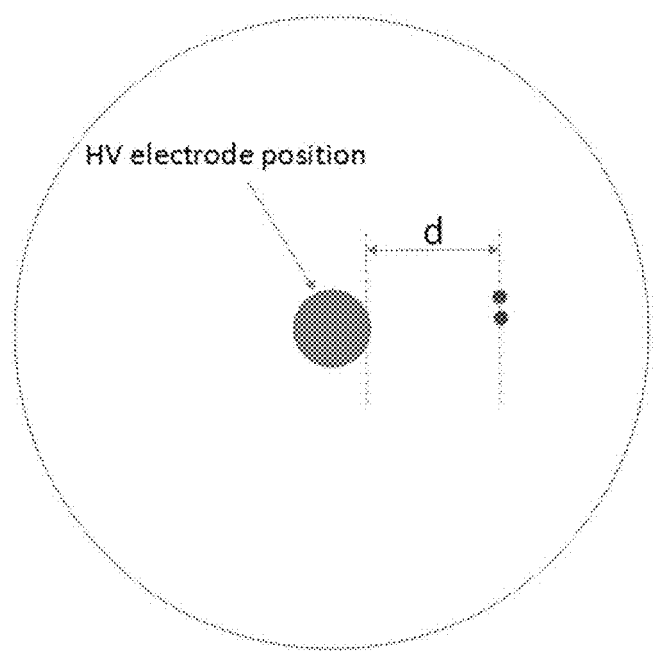
FIG. 30A illustrates a measurement of surface resistance.
Figure 30B:
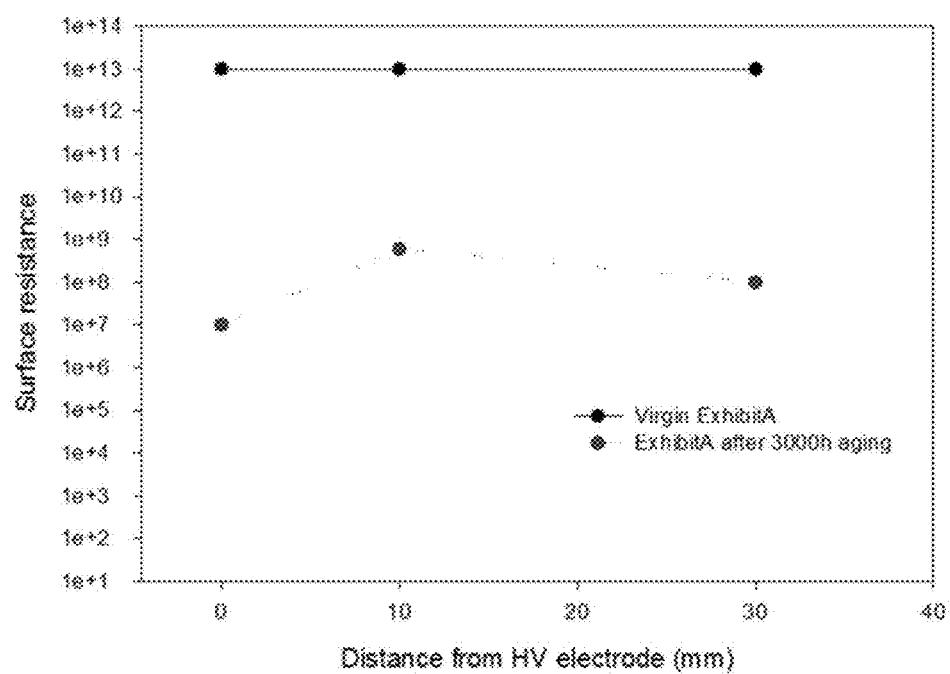
FIG. 30B is a graph of surface resistance for nanostructured insulation.

The generated self-repairing, nonlinearly conductive coating's resistivity was measured with a qualitative 2-probe surface resistivity measurement. As shown in FIGS. 30A and 30B, 50 V DC is applied to the probes and placed on the sample surface for one minute before the resistivity measurement is taken. The distance between the probes is 1 mm and the surface resistivity was measured as a function of the distance from the high voltage electrode. The surface resistance of virgin samples is approximately $10^{13}$ Ohms. The surface resistance of the aged samples was reduced 4-6 orders of magnitude to approximately $10^7$ Ohms near the high voltage electrode. The change in surface resistance occurs along nearly the entire surface moving away from the high voltage electrode (e.g., approximately 30 mm away from the high voltage electrode).

C. Partial Discharge

Figure 31:
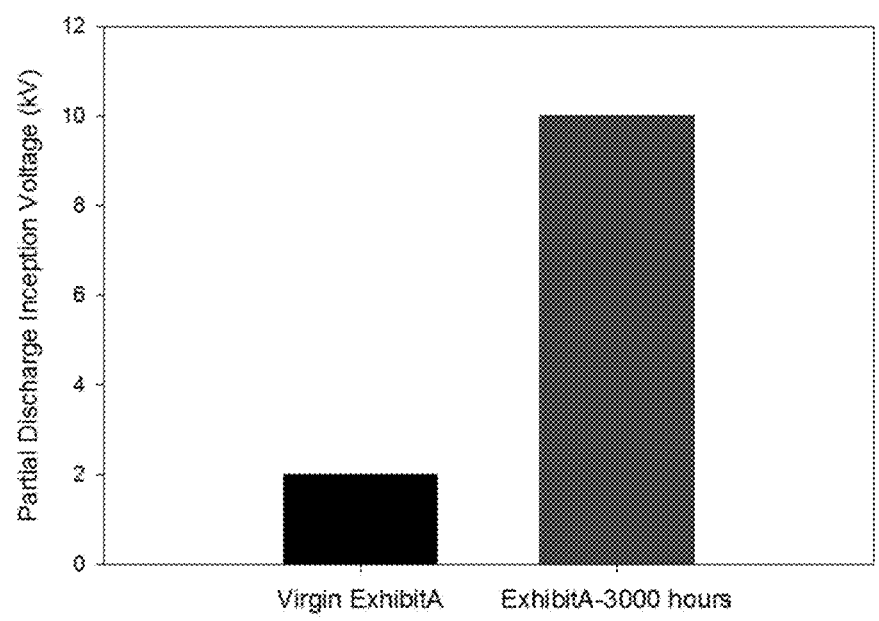
FIG. 31 is a graph of partial discharge inception voltage.
Figure 32A:
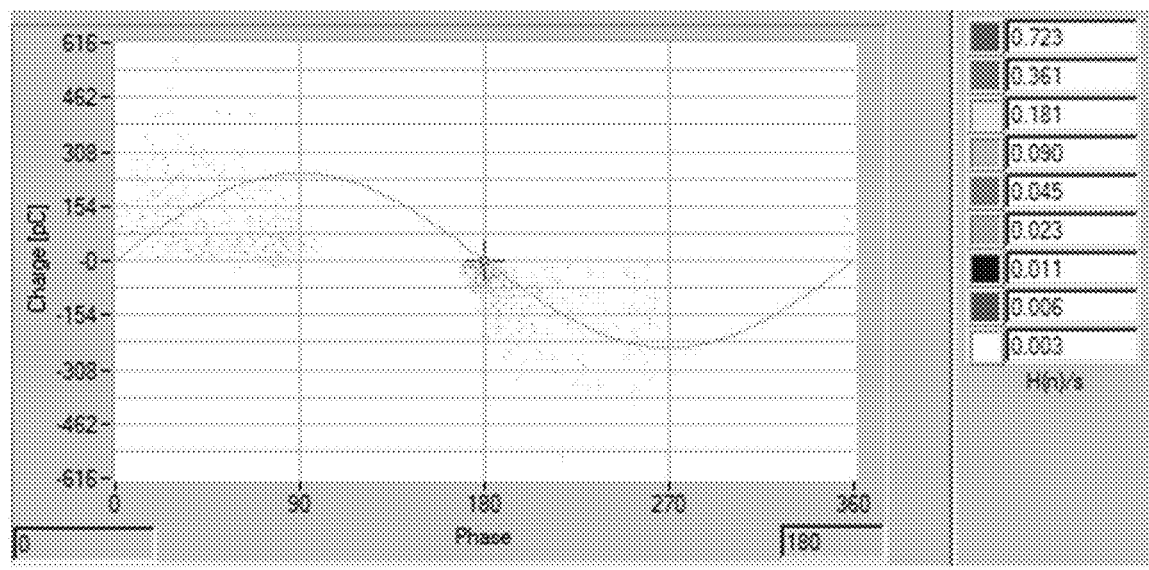
FIG. 32A is a graph of phase resolved partial discharge patterns at 2,000 V for a virgin nanostructured insulation sample.
Figure 32B:
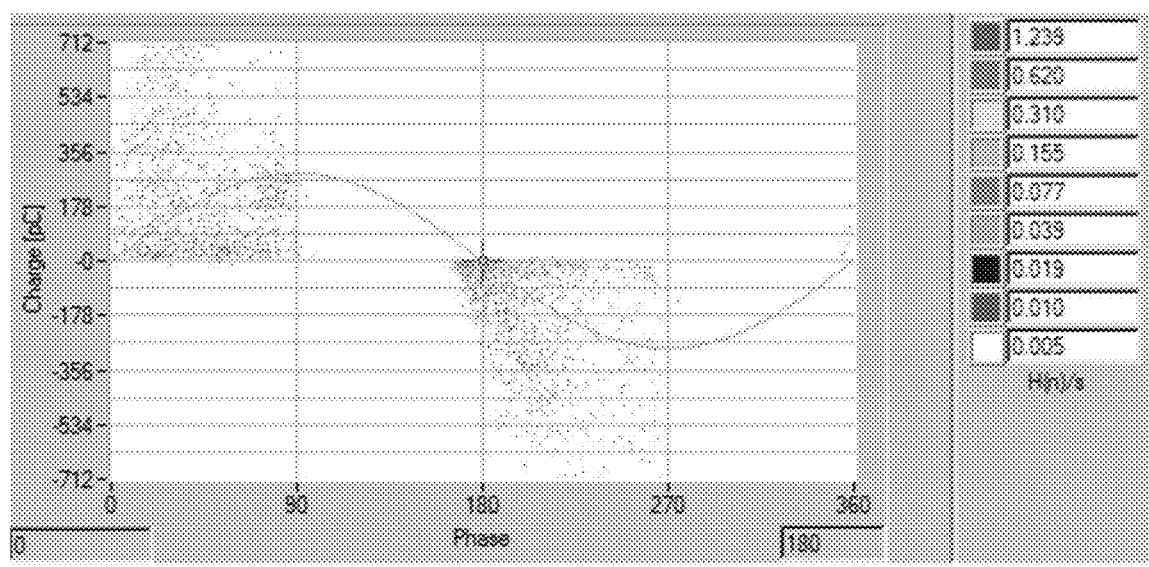
FIG. 32B is a graph of phase resolved partial discharge patterns at 2,200 V for a virgin nanostructured insulation sample.
Figure 32C:
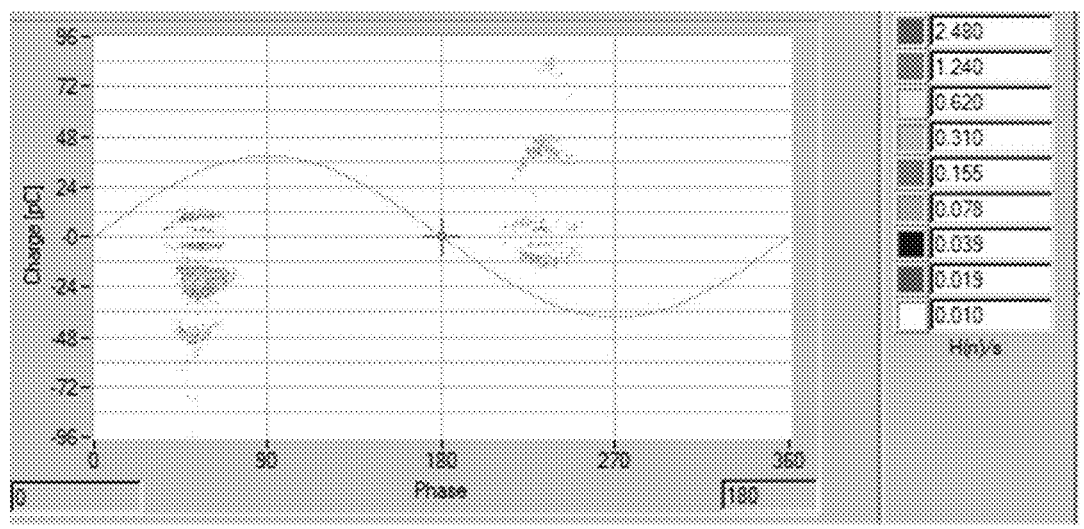
FIG. 32C is a graph of phase resolved partial discharge patterns at 10,000 V for a 3000 hours aged nanostructured insulation sample.
Figure 32D:
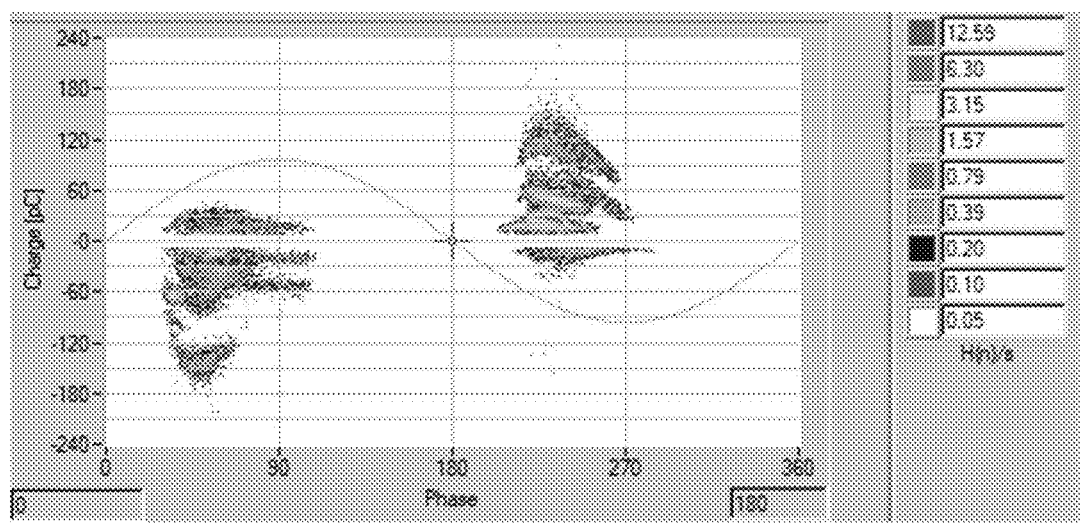
FIG. 32D is a graph of phase resolved partial discharge patterns at 12,000 V for a 3000 hours aged nanostructured insulation sample.

A partial discharge analysis for the generated self-repairing, nonlinearly conductive coating was used to measure a partial discharge inception voltage ("PDIV") and phase resolved partial discharge ("PRPD") patterns during the endurance testing. The partial discharge analysis was conducted using a digital partial discharge measuring and diagnosis system. As shown in FIG. 31, a significant difference exists between the PDIV for the virgin samples and PDIV for the 3000 hours aged Exhibit A samples. The PDIV was 2000 V for the virgin Exhibit A sample and 10000 V for Exhibit A after 3000 hours of discharge aging. Typical PRPD patterns for the virgin Exhibit A at 2000 V and 2200 V are shown in FIGS. 32A and 32B, respectively. PRPD patterns for the 3000 hours aged sample of Exhibit A at 10000 V and 12000 V are shown in FIGS. 32C and 32D, respectively. At the PDIV, the inception phase of the 3000 hour aged sample of Exhibit A is higher (i.e., 40°) than the virgin sample of Exhibit A (i.e., −10°). For the virgin sample of Exhibit A, partial discharge occurs entirely in the rising halves of the positive and negative voltage cycles. For the 3000 hours aged sample of Exhibit A, partial discharge is concentrated in the range of 40°-60° for the positive half cycle and 130°-150° for the negative half cycle. Under lower voltages (e.g., 2000 V), the magnitudes of the partial discharge pulses are in the range of 600 pC-720 pC for the virgin sample of Exhibit A. The self-repairing, nonlinearly conductive coating significantly increases the PDIV and suppresses the magnitudes of the partial discharge to only 50 pC-150 pC for voltages as high as 10000 V. The suppression of partial discharge that results from the formation of the self-repairing, nonlinearly conductive coating contributes to the improved discharge resistance of the nanostructured insulation.

Figure 33A:
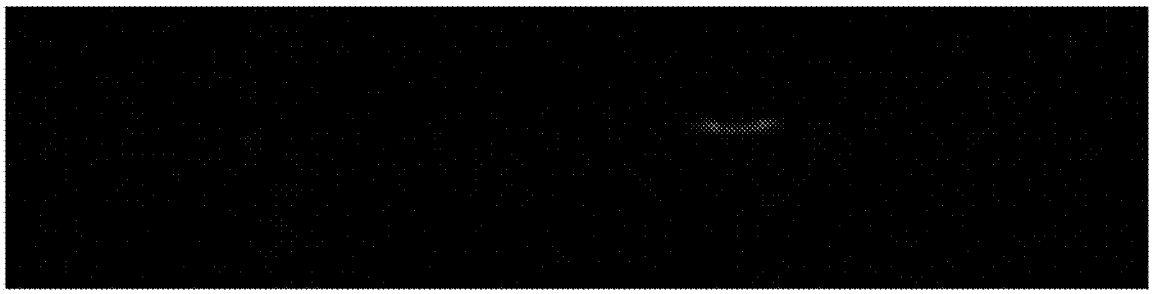
FIG. 33A is a surface discharge photograph of a 3000 hours aged nanostructured insulation sample (left) and a virgin nanostructured insulation sample (right) at 10,000 V.
Figure 33B:
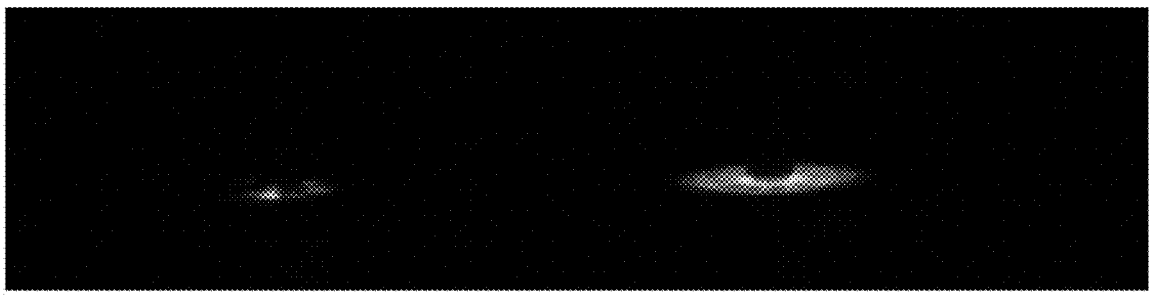
FIG. 33B is a surface discharge photograph of a 3000 hours aged nanostructured insulation sample (left) and a virgin nanostructured insulation sample (right) at 15,000 V.
Figure 33C:
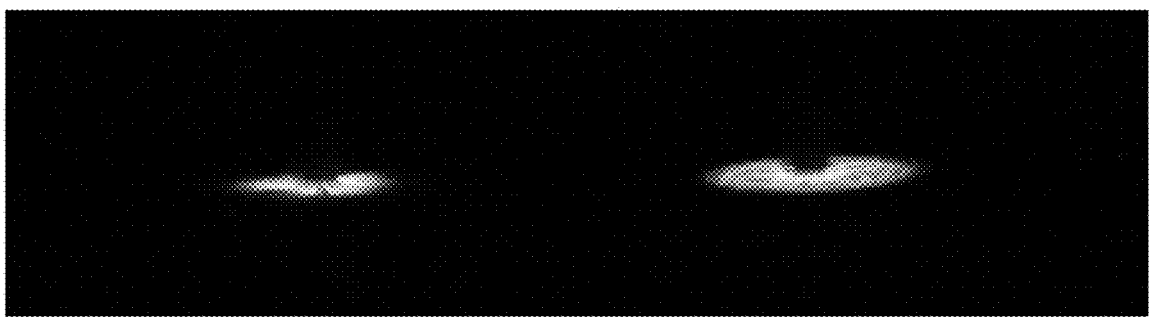
FIG. 33C is a surface discharge photograph of a 3000 hours aged nanostructured insulation sample (left) and a virgin nanostructured insulation sample (right) at 20,000 V.

FIGS. 33A, 33B, and 33C show surface electrical discharge images of the virgin sample of Exhibit A (right) and the 3000 hours aged sample of Exhibit A (left) for different applied voltages. In FIG. 33A, the applied voltage is 10000 V. In FIG. 33B, the applied voltage is 15000 V. In FIG. 33C, the applied voltage is 20000 V. At 10000 V, no emission of light is observed from the 3000 hours aged sample of Exhibit A, but emission of light is observable from the virgin sample of Exhibit A. At higher voltages, emission of light is intensified due to higher electric fields. The circular luminous area emitting light from the surface of the 3000 hours aged sample of Exhibit A is smaller than the circular luminous area emitting light from the surface of the virgin sample of Exhibit A. The emission of light is also more homogenous and uniform for the 3000 hours aged sample of Exhibit A. A photograph of the self-repairing, nonlinearly conductive coating can be seen in FIG. 29B (far right), where a discharge-free circle is visible on the surface of the aged sample of Exhibit A near the high voltage electrode. The surface electrical conductivity within the discharge-free circuit is high enough to short a potential gradient across the circuit, which demonstrates the formation of the self-repairing, nonlinearly conductive coating on the surface of the nanostructured insulation.

Implementation

Electric machines (e.g., rotating machines, linear displacement machines, transformers, magnetic devices, etc.) with the ability to withstand high temperatures from increased thermal conductivity can significantly impact the design and control of systems within which the electric machines are implemented. Table 6 summarizes how a nanostructured insulating material having high thermal conductivity and high VPM capability can broaden the operating range of an electric machine, systems including electric machines, and devices including electric machines.

TABLE #6

Electric Machine Trade-Offs

| Thermal Conductivity | Electrical Insulation Rating | Gas Pressure | Current |
|---|---|---|---|
| ↑ | ↔ | ↔ | ↔ |
| ↑ | ↔ | ↓ | ↔ |
| ↑ | ↔ | ↔ | ↑ |
| ↑ | ↑ | ↔ | ↑ |

TABLE #6:

Electric Machine Trade-Offs (Continued)

| Copper Temperature | Power Loss of Copper | Windage Loss | Power Output | Efficiency |
|---|---|---|---|---|
| ↓ | ↓ | ↔ | ↔ | ↑ |
| ↔ | ↔ | ↓ | ↔ | ↑ |
| ↔ | ↑ | ↔ | ↑ | ? |
| ↔ | ↔ | ↔ | ↑ | ↑ |

Higher current density in electric machines results in higher torque (or force) density for the same size machine or the same torque (or force) density as an existing machine but with reduced (i.e., more compact) size. Stationary machines will benefit from higher currents, increased voltage ratings, and an ability to withstand higher harmonic components, which can be reflected in increased temperature de-rating factors (i.e., closer to no de-rating).

In some embodiments, an electric machine including nanostructured insulation is connected to an electric motor drive. Electric motor drives conventionally include an inverter supplying the electric machine. Higher thermal conductivity of the electric machine's insulating material and higher current capability leads to an increased current rating for the inverter. If the insulating material can also withstand higher electric fields before breakdown, higher voltages can be applied to the electric machine. In some embodiments, a DC choke in an active rectifier application includes nanostructured insulation. The DC choke then has an increased ability to withstand higher currents and dissipate harmonic losses caused by both copper and core losses.

A. Electric Machine Losses and Thermal Considerations

A model for a medium voltage induction machine included the physical measurements, geometry, machine parameters, and other specifications set forth in Table 7.

TABLE #7

Electric Machine Design

| Machine | | | |
|---|---|---|---|
| Number of Poles | 24 | Reference Speed | 193 RPM |
| Machine → Stator | | | |
| Outer Diameter | 1170 mm | Inner Diameter | 950 mm |
| Length | 1000 mm | Number of Slots | 144 |
| Machine → Stator → Slot | | | |
| HsO | 1 mm | Hsl | 2.5 mm |
| Hs2 | 75 mm | | |
| Machine → Stator → Winding | | | |
| Coil Pitch | 5 | Number of Strands | 1 |
| Machine → Rotor | | | |
| Number of Slots | 108 | Outer Diameter | 948 mm |
| Inner Diameter | 180 mm | Length | 1000 mm |
| Machine → Rotor → Winding | | | |
| Bar Conductor | Copper | End Length | 25 mm |
| End Ring Width | 25 mm | End Right Height | 25 mm |
| Analysis → Setup | | | |
| Rated Output Power | 4500 HP | Rated Voltage | 4160 V |
| Rated Speed | 193 RPM | Operating Temp. | 75° C. |
| Winding Connection | Wye | Frequency | 40 Hz |

Figure 34:
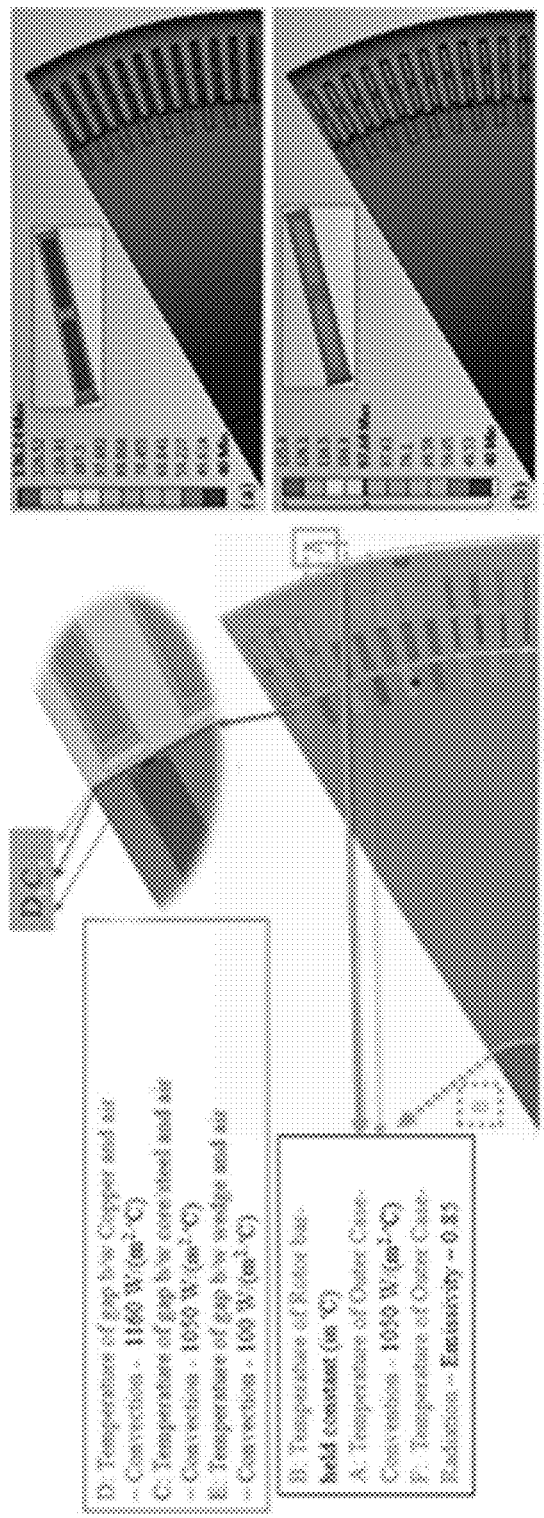
FIG. 34 illustrates temperature profiles for an electric machine including mica insulation and an electric machine including nanostructured insulation.

The model electric machine was designed using the RMxprt tool in ANSYS Maxwell. The operating fields of the ground-wall insulation were set at 65 VPM for both the electric machine including mica insulation and the electric machine including nanostructured insulation. The thermal conductivities were set at 0.25 W/mK for the mica insulation and 0.7 W/mK for the nanostructured insulation. The geometry from RMxprt was imported to Maxwell and the machine structural parameters, electromagnetic parameters, and operating conditions were established. Maxwell then automatically generated the corresponding machine geometry and excitation. The electric machine model was used to evaluate the dependence of machine properties (e.g., torque characteristics and efficiency) on electromagnetic design and machine parameters. A thermal model was constructed using ANSYS SteadyState Thermal analysis software. Multi-physics coupling of electromagnetic and thermal modeling was achieved by linking ANSYS, Maxwell, and ANSYS SteadyState with ANSYS Workbench. As illustrated in FIG. 34, for various load conditions, there is a fixed 40° C. temperature difference between the maximum temperature of the machine insulated with mica insulation and the maximum temperature of machine with nanostructured insulation.

B. Induction Machine with Enhanced Torque Capabilities

A medium voltage induction motor with nanostructured insulation is capable of higher current draw and torque production before reaching maximum temperature. As a result, the medium voltage induction machine with nanostructured insulation can be re-rated to match the temperature profile of the medium voltage induction machine with mica insulation while producing more torque.

Figure 35A:
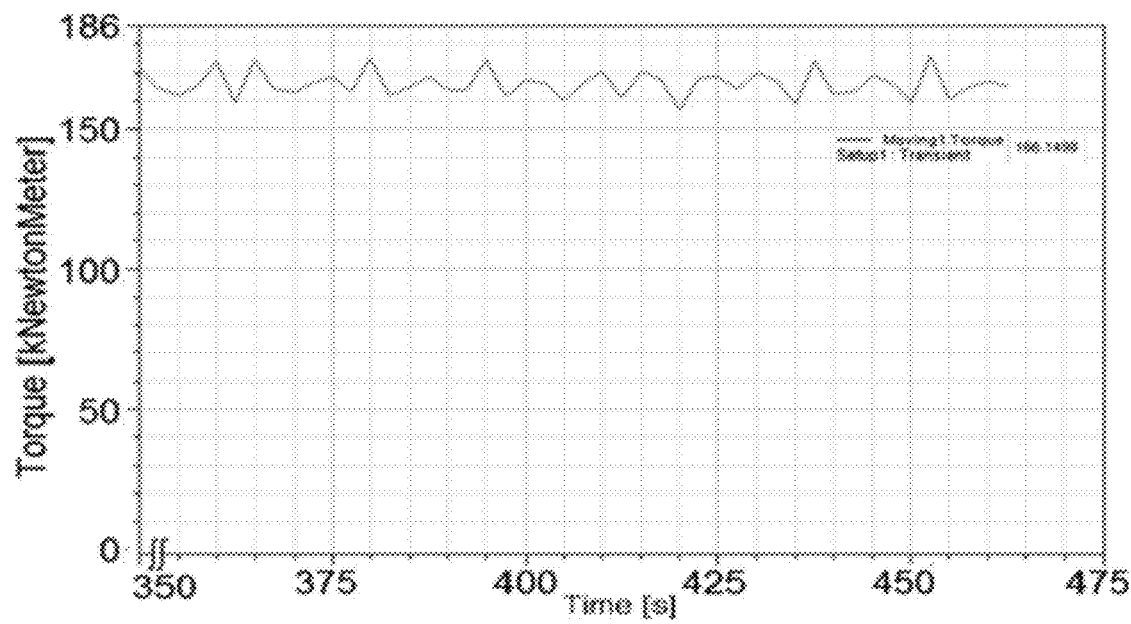
FIGS. 35A and 35B are graphs of torque density for an electric machine including nanostructured insulation.
Figure 35B:
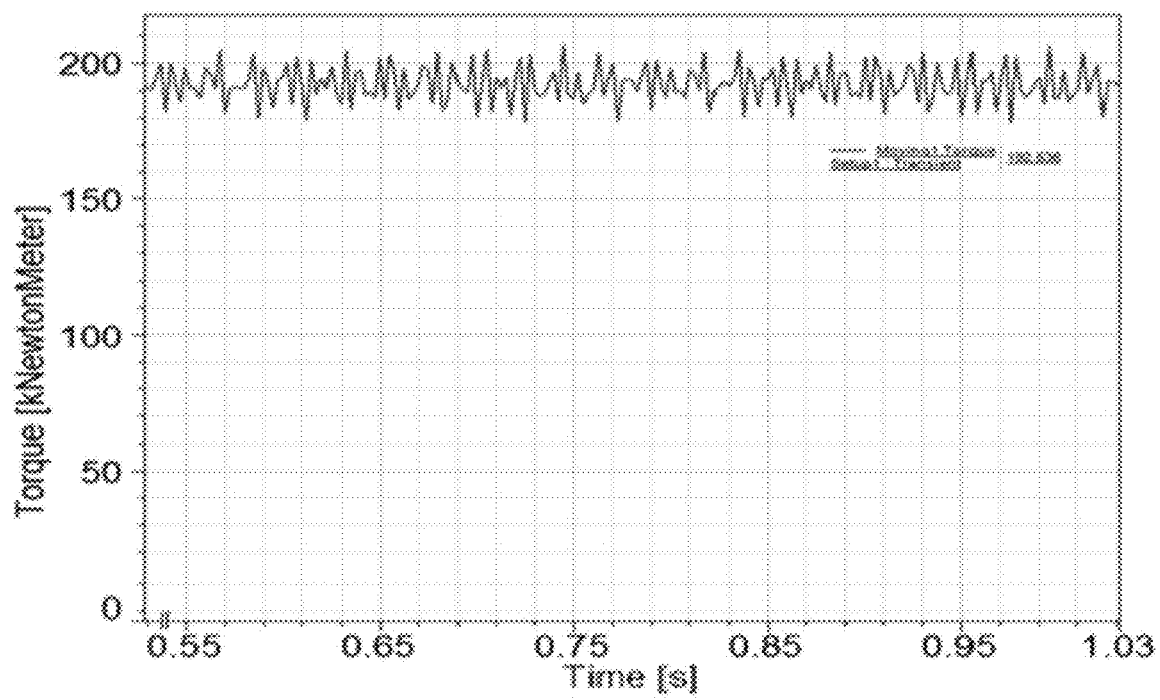

FIGS. 35A and 35B illustrate the differences in maximum torque that can be achieved in a re-rated medium voltage induction motor with nanostructured insulation. The maximum torque is increased by approximately 15% (FIG. 35B) for the re-rated medium voltage induction motor compared to the originally-rated medium voltage induction motor (FIG. 35A). In some embodiments, torque density re-rating is based on applying nanostructured insulation to a preexisting machine design. In other embodiments, system level optimization to reduce rotor loss and end winding loss under reduced gas pressure (e.g., fan loss) produce a 50% increase in torque density and payload efficiency.

Figure 36:
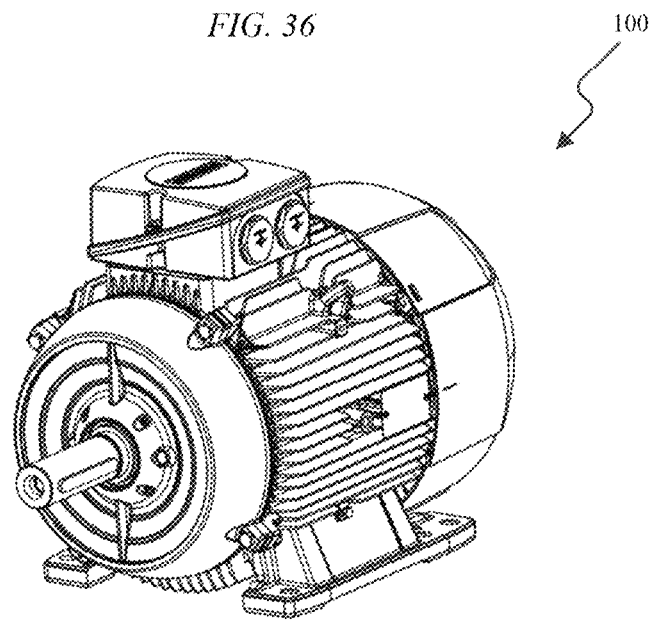
FIG. 36 illustrates a motor including a nanostructured insulation.
Figure 37:
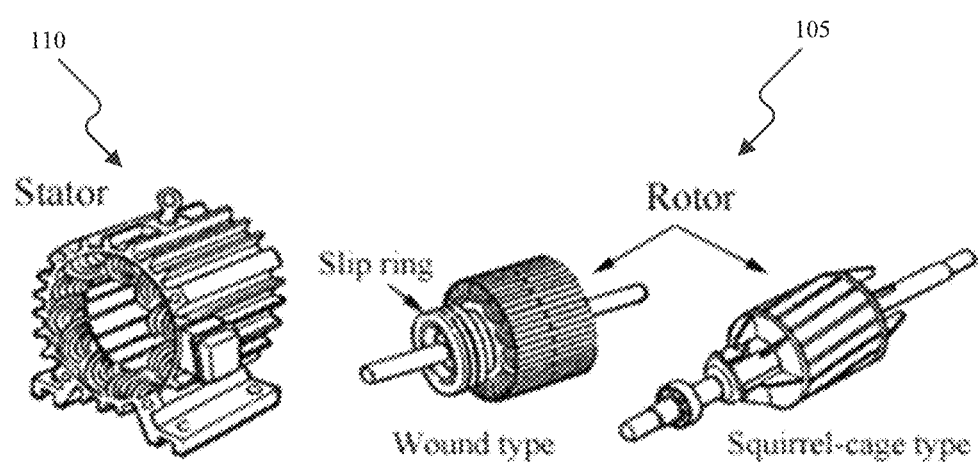
FIG. 37 illustrates a rotor and a stator of the motor of FIG. 36.

A motor 100 implementing the nanostructured insulation material is illustrated in FIG. 36. As shown in FIG. 37, the motor 100 includes a rotor 105 and a stator 110. The motor 100 is, for example, an induction motor. However, the nanostructured insulation material can be applied to any electric machine that includes, for example, at least one winding in the rotor 105 or stator 110. For example, a motor winding can be wound or wrapped around a motor lamination or motor lamination stack of the rotor 105 or stator 110. As the winding is wound around the motor laminations, empty space between the surfaces of the motor laminations and the winding is created. These empty spaces can be filled with the nanostructured insulation described herein to improve the overall performance of the motor. Other applications include transformers, circuit breakers, permanent magnet motors for electrically-propelled vehicles (e.g., destroyers, submarines, electric cars, locomotives, etc.), electromagnetic aircraft launch systems ("EMALS"), and other industrial applications that generally involve insulated conductors such as busbars, power circuit boards, power distribution and transmission cables, isolation circuits, enclosures or housings of power apparatuses and devices, etc.

Thus, embodiments described herein provide, among other things, a nanostructured insulation for, among other things, motor windings. Various features and advantages of the embodiments described herein are set forth in the following claims.

What is claimed is:

1. An insulating composition comprising:
   a polymer resin;
   a nanoclay; and
   one or more nanofillers, the one or more nanofillers including zinc oxide and wherein the composition comprises greater than about 5% zinc oxide by weight.

2. The insulating composition of claim 1, wherein the polymer resin is one selected from the group consisting of: epoxy resin, silicone rubber, polyester resin, polyimides, polyetherimides, polysulfones, polyether ether keton, polycarbonates, and polyamide-imides.

3. The insulating composition of claim 1, wherein the nanoclay is one selected from the group consisting of: montmorillonite, kaolin, and talc.

4. The insulating composition of claim 1, wherein the composition comprises about 5% zinc oxide to about 15% zinc oxide by weight.

5. The insulating composition of claim 4, wherein the composition comprises about 7% zinc oxide to about 10% zinc oxide by weight.

6. The insulating composition of claim 1, wherein a combination of the nanoclay and the one or more nanofillers comprises a maximum of about 40% of the insulating composition by weight.

7. A motor comprising,
   at least one winding associated with the motor; and
   a nanostructured insulating composition applied to the at least one winding, wherein the nanostructured insulating composition comprises:
   a polymer resin,
   a nanoclay, and
   one or more nanofillers, the one or more nanofillers including zinc oxide and wherein the composition comprises greater than about 5% zinc oxide by weight.

8. The motor of claim 7, wherein the polymer resin is one selected from the group consisting of: epoxy resin, silicone rubber, polyester resin, polyimides, polyetherimides, polysulfones, polyether ether keton, polycarbonates, and polyamide-imides.

9. The motor of claim 7, wherein the nanoclay is one selected from the group consisting of: montmorillonite, kaolin, and talc.

10. The motor of claim 7, wherein the composition comprises about 5% zinc oxide to about 15% zinc oxide by weight.

11. The motor of claim 10, wherein the composition comprises about 7% zinc oxide to about 10% zinc oxide by weight.

12. A device comprising:
   a nanostructured insulating composition applied to a portion of the device, wherein the nanostructured insulating composition comprises:
   a polymer resin,
   a nanoclay, and
   one or more nanofillers, the one or more nanofillers including zinc oxide and wherein the composition comprises greater than about 5% zinc oxide by weight.

13. The device of claim 12, wherein the device is one selected from the group consisting of: a circuit board, a transmission cable, an isolation circuit, and a device housing.

14. The device of claim 12, wherein the device is one selected from the group consisting of: a transformer, a circuit breaker, and a motor.

15. The device of claim 14, wherein the motor is one selected from the group consisting of: an induction motor and a permanent magnet motor.

16. The device of claim 12, wherein the composition comprises about 5% zinc oxide to about 15% zinc oxide by weight.

17. The device of claim 16, wherein the composition comprises about 7% zinc oxide to about 10% zinc oxide by weight.

18. The device of claim 12, wherein the polymer resin is one selected from the group consisting of: epoxy resin, silicone rubber, polyester resin, polyimides, polyetherimides, polysulfones, polyether ether keton, polycarbonates, and polyamide-imides.

19. The device of claim 12, wherein the nanoclay is one selected from the group consisting of: montmorillonite, kaolin, and talc.

20. The device of claim 12, wherein a combination of the nanoclay and the one or more nanofillers comprises a maximum of about 40% of the insulating composition by weight.

\* \* \* \* \*